US008074068B2

(12) United States Patent
Fujii et al.

(10) Patent No.: US 8,074,068 B2
(45) Date of Patent: Dec. 6, 2011

(54) SECRET SHARING DEVICE, METHOD, AND PROGRAM

(75) Inventors: Yoshihiro Fujii, Fuchu (JP); Norikazu Hosaka, Fuchu (JP); Minako Tada, Komae (JP); Takehisa Kato, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 845 days.

(21) Appl. No.: 12/114,237

(22) Filed: May 2, 2008

(65) Prior Publication Data

US 2009/0144543 A1 Jun. 4, 2009

(30) Foreign Application Priority Data

Jun. 26, 2007 (JP) ................................ 2007-168082

(51) Int. Cl.
*H04K 1/00* (2006.01)
*H04L 9/00* (2006.01)
*H04L 9/28* (2006.01)
*H04L 29/06* (2006.01)
*G06F 15/16* (2006.01)

(52) U.S. Cl. ............ 713/160; 380/28; 380/46; 380/212; 713/162; 713/163; 709/208; 709/209; 709/211

(58) Field of Classification Search .................... 380/28, 380/277
See application file for complete search history.

(56) References Cited

U.S. PATENT DOCUMENTS 5,485,474 A * 1/1996 Rabin ........................... 714/762
5,708,714 A * 1/1998 Lopez et al. .................. 713/180
5,764,767 A * 6/1998 Beimel et al. ................. 713/180
6,182,214 B1 * 1/2001 Hardjono ...................... 713/163
6,477,254 B1 * 11/2002 Miyazaki et al. ............. 380/286
2004/0148512 A1 * 7/2004 Park et al. ...................... 713/193
2007/0160197 A1 * 7/2007 Kagaya et al. .................. 380/28

FOREIGN PATENT DOCUMENTS

JP 2004-213650 7/2004

OTHER PUBLICATIONS

"Secret image sharing with smaller shadow images" by Ran-Zan Wang (Oct. 25, 2005); Pattern Recognition Letters; pp. 551-555; originally downloaded from http://linkinghub.elsevier.com/retrieve/pii/S0167865505002734.*

"A Reliable (k, n) Image Secret Sharing Scheme" by Li Bai (2006); Proceedings of the 2nd IEEE International Symposium on Dependable, Autonomic and Secure Computing (DASC'06); 6 pages; originally downloaded from http://ieeexplore.ieee.org/xpls/abs_all.jsp?arnumber=4030863&tag=1.*

(Continued)

*Primary Examiner* — Carl Colin
*Assistant Examiner* — Phillip Auger
(74) *Attorney, Agent, or Firm* — Oblon, Spivak, McClelland, Maier & Neustadt, L.L.P.

(57) ABSTRACT

A secret sharing device of (k, n) threshold scheme creates a generator matrix G, first divided secret data, and random number data, calculates shared partial data based on the product of matrices with the random number data, the divided secret data, and the generator matrix G, and delivers the shared information formed by the shared partial data and the header information individually to the storage units. The secret sharing device calculates a recovery matrix and multiplies the shared information by the recovery matrix, hence to recover the secret information.

7 Claims, 20 Drawing Sheets

OTHER PUBLICATIONS

"A Strong Ramp Secret Sharing Scheme Using Matrix Projection" by Li Bai (2006); Proceedings of the 2nd IEEE International Symposium on Dependable, Autonomic and Secure Computing (DASC'06); 5 pages; originally downloaded from http://ieeexplore.ieee.org/xpls/abs_all.jsp?arnumber=1648530.*
"Constructions and Properties of k out of n Visual Secret Sharing Schemes" by Eric R. Verheul (1997); Designs, Codes and Cryptography; pp. 179-196; originally downloaded from http://portal.acm.org/citation.cfm?id=257518.*
"Efficient visual secret sharing scheme for color images" by Shyong Jian Shyu (Jun. 3, 2005); Pattern Recognition; pp. 866-880; originally downloaded from http://linkinghub.elsevier.com/retrieve/pii/S0031320305002268.*
"New Efficient and Secure Protocols for Verifiable Signature Sharing and Other Applications" by Dario Catalano (Aug. 26, 1999); 30 pages; originally downloaded from http://citeseerx.ist.psu.edu/viewdoc/summary?doi=10.1.1.26.9201.*
"Simple and Efficient Threshold Cryptosystem from the Gap Diffie-Hellman Group" by Joonsang Baek (2003); GLOBECOM; pp. 1491-1495; originally downloaded from http://citeseerx.ist.psu.edu/viewdoc/summary?doi=10.1.1.119.1717.*
"Computer and Network Security—Key Escrow and Secret Sharing" by R.E. Newman (2000); 15 pages; originally downloaded from http://www.cise.ufl.edu/~nemo/crypto/key-escrow.pdf.*
"Key Escrow" by Ozalp Babaoglu (2006); 6 pages; originally downloaded from http://www.cs.unibo.it/~babaoglu/courses/security06-07/lucidi/key-escrow.pdf.*
"Linear Algebra and Its Applications—Second Edition" by David C. Lay (Mar. 1997); pp. xx, 2-4, 8, 26 (6 pages total); relevant pages converted to PDF originally from noted book.*
"Implementation of Shamir's method for sharing a secret" by Charles Karney (Aug. 21, 2001); 1 page; converted to PDF originally from http://charles.karney.info/misc/secret.html.*
"SSSS: Shamir's Secret Sharing Scheme—Windows port" by Alex Seidlitz (Jan. 16, 2006); 1 page; converted to PDF originally from http://www.seidlitz.ca/ssss/.*
"On secret sharing systems" by Ehud Karnin et al. (1983); 7 pages; originally downloaded from http://citeseerx.ist.psu.edu/viewdoc/summary?doi=10.1.1.132.9203.*
"Applied Cryptography—Second Edition" by Bruce Schneier (1996); pp. 528-531 (4 pages total); relevant pages converted to PDF originally from noted book.*
Adi Shamir, "How to Share a Secret", Communications of the ACM, vol. 22, No. 11, Nov. 1979, pp. 612-613.
Yoshihiro Fujii, et al., "A Fast (2,n)-Threshold Scheme and Its Application", Proc. CSS2005, 6 pages, 2005.
Jun Kurihara, et al., "A (3,n)-Threshold Secret Sharing Scheme using XOR Operations", Proc. SCIS2007, 2007, 6 pages.

* cited by examiner

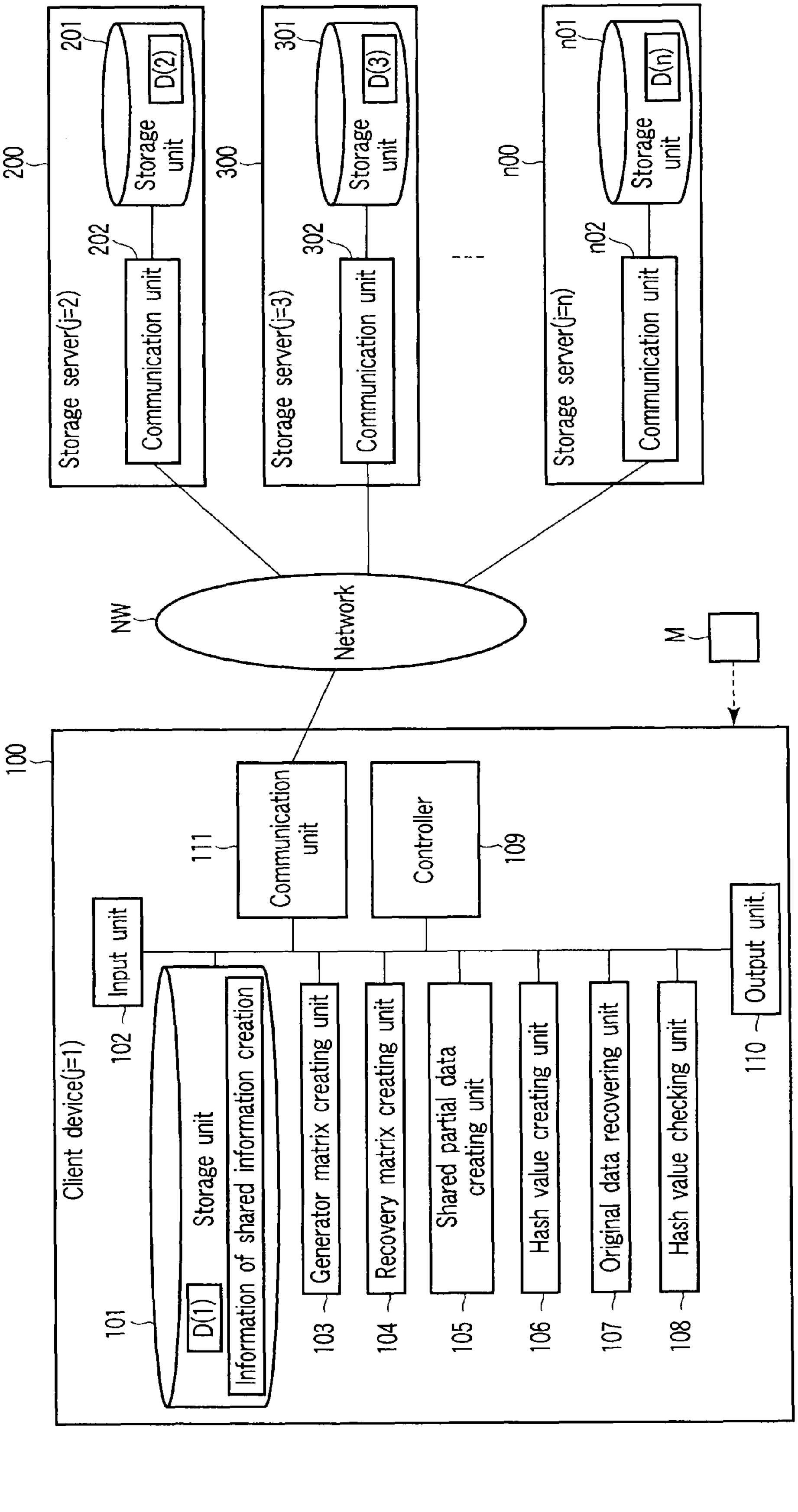
F I G. 1

G=

| | g(D(1)) | | | | g(D(2)) | | | | g(D(3)) | | | | g(D(4)) | | | | g(D(5)) | | | | |
|---|---|---|---|---|---|---|---|---|---|---|---|---|---|---|---|---|---|---|---|---|---|
| Column number | 1 | 2 | 3 | 4 | 5 | 6 | 7 | 8 | 9 | 10 | 11 | 12 | 13 | 14 | 15 | 16 | 17 | 18 | 19 | 20 | Row number |
| | 1 | 0 | 0 | 0 | 1 | 0 | 0 | 0 | 1 | 0 | 0 | 0 | 1 | 0 | 0 | 0 | 1 | 0 | 0 | 0 | 1 |
| | 0 | 1 | 0 | 0 | 0 | 1 | 0 | 0 | 0 | 1 | 0 | 0 | 0 | 1 | 0 | 0 | 0 | 1 | 0 | 0 | 2 |
| | 0 | 0 | 1 | 0 | 0 | 0 | 1 | 0 | 0 | 0 | 1 | 0 | 0 | 0 | 1 | 0 | 0 | 0 | 1 | 0 | 3 |
| | 0 | 0 | 0 | 1 | 0 | 0 | 0 | 1 | 0 | 0 | 0 | 1 | 0 | 0 | 0 | 1 | 0 | 0 | 0 | 1 | 4 |
| | 1 | 0 | 0 | 0 | 0 | 0 | 0 | 0 | 0 | 0 | 0 | 1 | 0 | 0 | 1 | 0 | 0 | 1 | 0 | 0 | 5 |
| | 0 | 1 | 0 | 0 | 1 | 0 | 0 | 0 | 0 | 0 | 0 | 0 | 0 | 0 | 0 | 1 | 0 | 0 | 1 | 0 | 6 |
| | 0 | 0 | 1 | 0 | 0 | 1 | 0 | 0 | 1 | 0 | 0 | 0 | 0 | 0 | 0 | 0 | 0 | 0 | 0 | 1 | 7 |
| | 0 | 0 | 0 | 1 | 0 | 0 | 1 | 0 | 0 | 1 | 0 | 0 | 1 | 0 | 0 | 0 | 0 | 0 | 0 | 0 | 8 |
| | 1 | 0 | 0 | 0 | 0 | 0 | 0 | 1 | 0 | 1 | 0 | 0 | 0 | 0 | 0 | 0 | 0 | 0 | 1 | 0 | 9 |
| | 0 | 1 | 0 | 0 | 0 | 0 | 0 | 0 | 0 | 0 | 1 | 0 | 1 | 0 | 0 | 0 | 0 | 0 | 0 | 1 | 10 |
| | 0 | 0 | 1 | 0 | 1 | 0 | 0 | 0 | 0 | 0 | 0 | 1 | 0 | 1 | 0 | 0 | 0 | 0 | 0 | 0 | 11 |
| | 0 | 0 | 0 | 1 | 0 | 1 | 0 | 0 | 0 | 0 | 0 | 0 | 0 | 0 | 1 | 0 | 1 | 0 | 0 | 0 | 12 |
| | 1 | 0 | 0 | 0 | 0 | 0 | 1 | 0 | 0 | 0 | 0 | 0 | 0 | 1 | 0 | 0 | 0 | 0 | 0 | 1 | 13 |
| | 0 | 1 | 0 | 0 | 0 | 0 | 0 | 1 | 1 | 0 | 0 | 0 | 0 | 0 | 1 | 0 | 0 | 0 | 0 | 0 | 14 |
| | 0 | 0 | 1 | 0 | 0 | 0 | 0 | 0 | 0 | 1 | 0 | 0 | 0 | 0 | 0 | 1 | 1 | 0 | 0 | 0 | 15 |
| | 0 | 0 | 0 | 1 | 1 | 0 | 0 | 0 | 0 | 0 | 1 | 0 | 0 | 0 | 0 | 0 | 0 | 1 | 0 | 0 | 16 |

G=

| g(D(1)) | g(D(2)) | g(D(3)) | ··· | g(D(n)) |
|---|---|---|---|---|
| E(0) | E(0) | E(0) | ··· | E(0) |
| E(0) | E(1) | E(2) | ··· | E(n-1) |
| E(0) | E(2) | E(4) | ··· | E(2(n-1)) |
| ⋮ | ⋮ | ⋮ | ··· | ⋮ |
| E(0) | E(k-1) | E((k-1)2) | ··· | E((k-1)(n-1)) |

FIG. 6

Partial matrix G' of generator matrix G'=

| g(D(i_1)) | g(D(i_2)) | g(D(i_3)) | ··· | g(D(i_k)) |
|---|---|---|---|---|
| U(1,1) | U(1,2) | U(1,3) | ··· | U(1,k) |
| U(2,1) | U(2,2) | U(2,3) | ··· | U(2,k) |
| U(3,1) | U(3,2) | U(3,3) | ··· | U(3,k) |
| ⋮ | ⋮ | ⋮ | ··· | ⋮ |
| U(k,1) | U(k,2) | U(k,3) | ··· | U(k,k) |

U(i,j)=E((i-1)(j-1)):(n-1) rows×(n-1) columns

Create

Basic matrix B(1)

FIG. 7

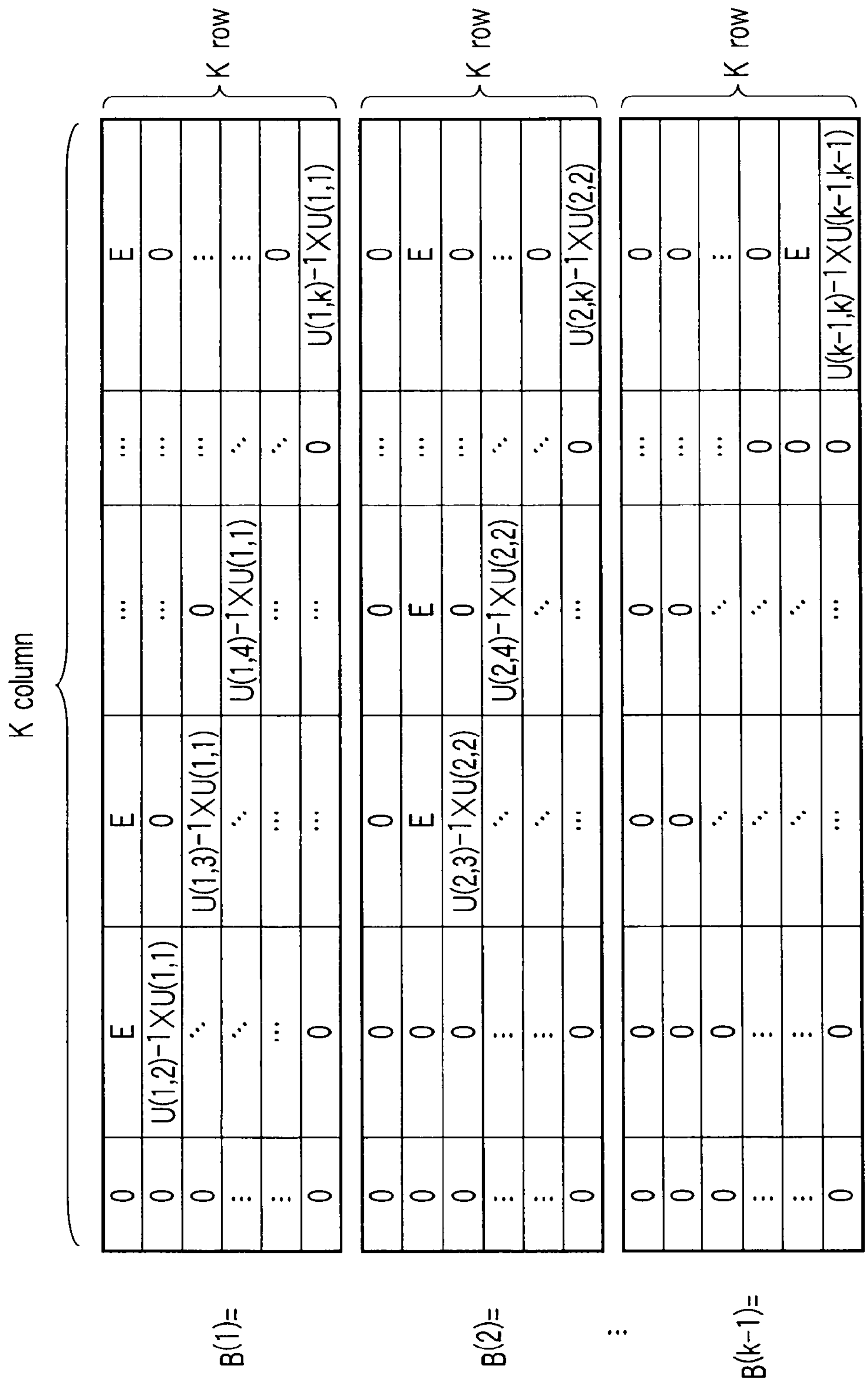

FIG. 8

$$B(1) = \begin{bmatrix} 0 & E & U(1,2)^{-1} \times U(1,1) & \cdots & E & \cdots & 0 \\ 0 & U(1,2)^{-1} \times U(1,1) & 0 & \cdots & 0 & \cdots & 0 \\ 0 & \ddots & U(1,3)^{-1} \times U(1,1) & \cdots & \vdots & \ddots & \vdots \\ \vdots & \vdots & \vdots & \ddots & U(1,4)^{-1} \times U(1,1) & \ddots & 0 \\ 0 & 0 & 0 & \cdots & \vdots & \ddots & U(1,k)^{-1} \times U(1,1) \end{bmatrix} \Biggr\} \text{K row}$$

$$B(2) = \begin{bmatrix} 0 & 0 & 0 & \cdots & 0 & \cdots & 0 \\ 0 & 0 & E & \cdots & E & \cdots & 0 \\ 0 & 0 & U(2,3)^{-1} \times U(2,2) & \ddots & 0 & \cdots & 0 \\ \vdots & \vdots & \ddots & \ddots & U(2,4)^{-1} \times U(2,2) & \ddots & \vdots \\ 0 & 0 & 0 & \cdots & \vdots & \ddots & U(2,k)^{-1} \times U(2,2) \end{bmatrix} \Biggr\} \text{K row}$$

$\cdots$ $$B(k-1) = \begin{bmatrix} 0 & 0 & 0 & \cdots & 0 & \cdots & 0 \\ 0 & 0 & 0 & \cdots & 0 & \cdots & 0 \\ 0 & 0 & 0 & \ddots & 0 & \cdots & 0 \\ \vdots & \vdots & \ddots & \ddots & \vdots & \ddots & E \\ 0 & 0 & 0 & \cdots & 0 & \cdots & U(k-1,k)^{-1} \times U(k-1,k-1) \end{bmatrix} \Biggr\} \text{K row}$$

$\underbrace{\qquad\qquad\qquad\qquad}_{\text{K column}}$ k column

B(k)=

| | | | | | |
|---|---|---|---|---|---|
| 0 | 0 | 0 | 0 | ⋯ | 0 |
| 0 | 0 | 0 | 0 | ⋯ | 0 |
| 0 | 0 | 0 | 0 | ⋯ | ⋮ |
| ⋮ | ⋮ | ⋱ | ⋱ | 0 | 0 |
| ⋮ | ⋮ | ⋱ | ⋱ | 0 | 0 |
| 0 | 0 | ⋯ | ⋯ | 0 | $U(k,k)^{-1}$ |

k row

| | | | | | | | | | | | | | | | | Row number |
|---|---|---|---|---|---|---|---|---|---|---|---|---|---|---|---|---|
| 0 | 0 | 0 | 0 | 1 | 0 | 0 | 0 | 1 | 0 | 0 | 0 | 1 | 0 | 0 | 0 | 1 |
| 0 | 0 | 0 | 0 | 0 | 1 | 0 | 0 | 0 | 1 | 0 | 0 | 0 | 1 | 0 | 0 | 2 |
| 0 | 0 | 0 | 0 | 0 | 0 | 1 | 0 | 0 | 0 | 1 | 0 | 0 | 0 | 1 | 0 | 3 |
| 0 | 0 | 0 | 0 | 0 | 0 | 0 | 1 | 0 | 0 | 0 | 1 | 0 | 0 | 0 | 1 | 4 |
| 0 | 0 | 0 | 0 | 1 | 0 | 0 | 0 | 0 | 0 | 0 | 0 | 0 | 0 | 0 | 0 | 5 |
| 0 | 0 | 0 | 0 | 0 | 1 | 0 | 0 | 0 | 0 | 0 | 0 | 0 | 0 | 0 | 0 | 6 |
| 0 | 0 | 0 | 0 | 0 | 0 | 1 | 0 | 0 | 0 | 0 | 0 | 0 | 0 | 0 | 0 | 7 |
| 0 | 0 | 0 | 0 | 0 | 0 | 0 | 1 | 0 | 0 | 0 | 0 | 0 | 0 | 0 | 0 | 8 |
| 0 | 0 | 0 | 0 | 0 | 0 | 0 | 0 | 1 | 0 | 0 | 0 | 0 | 0 | 0 | 0 | 9 |
| 0 | 0 | 0 | 0 | 0 | 0 | 0 | 0 | 0 | 1 | 0 | 0 | 0 | 0 | 0 | 0 | 10 |
| 0 | 0 | 0 | 0 | 0 | 0 | 0 | 0 | 0 | 0 | 1 | 0 | 0 | 0 | 0 | 0 | 11 |
| 0 | 0 | 0 | 0 | 0 | 0 | 0 | 0 | 0 | 0 | 0 | 1 | 0 | 0 | 0 | 0 | 12 |
| 0 | 0 | 0 | 0 | 0 | 0 | 0 | 0 | 0 | 0 | 0 | 0 | 1 | 0 | 0 | 0 | 13 |
| 0 | 0 | 0 | 0 | 0 | 0 | 0 | 0 | 0 | 0 | 0 | 0 | 0 | 1 | 0 | 0 | 14 |
| 0 | 0 | 0 | 0 | 0 | 0 | 0 | 0 | 0 | 0 | 0 | 0 | 0 | 0 | 1 | 0 | 15 |
| 0 | 0 | 0 | 0 | 0 | 0 | 0 | 0 | 0 | 0 | 0 | 0 | 0 | 0 | 0 | 1 | 16 |
| 1 | 2 | 3 | 4 | 5 | 6 | 7 | 8 | 9 | 10 | 11 | 12 | 13 | 14 | 15 | 16 | Column number |

FIG. 11

$B(1)\cdot B(2)\cdot B(3)\cdot B(4)=$
$(B(1)\cdot\cdots\cdot B(k))$

| | | | | | | | | | | | | | | | | Row number |
|---|---|---|---|---|---|---|---|---|---|---|---|---|---|---|---|---|
| | 0 | 0 | 0 | 0 | 0 | 0 | 0 | 0 | 0 | 0 | 0 | 0 | 1 | 0 | 1 | 1 | 1 |
| | 0 | 0 | 0 | 0 | 0 | 0 | 0 | 0 | 0 | 0 | 0 | 0 | 0 | 0 | 0 | 1 | 2 |
| | 0 | 0 | 0 | 0 | 0 | 0 | 0 | 0 | 0 | 0 | 0 | 0 | 0 | 1 | 0 | 0 | 3 |
| | 0 | 0 | 0 | 0 | 0 | 0 | 0 | 0 | 0 | 0 | 0 | 0 | 1 | 0 | 0 | 1 | 4 |
| | 0 | 0 | 0 | 0 | 0 | 0 | 0 | 0 | 0 | 0 | 0 | 0 | 0 | 1 | 0 | 0 | 5 |
| | 0 | 0 | 0 | 0 | 0 | 0 | 0 | 0 | 0 | 0 | 0 | 0 | 0 | 1 | 1 | 0 | 6 |
| | 0 | 0 | 0 | 0 | 0 | 0 | 0 | 0 | 0 | 0 | 0 | 0 | 0 | 1 | 1 | 1 | 7 |
| | 0 | 0 | 0 | 0 | 0 | 0 | 0 | 0 | 0 | 0 | 0 | 0 | 1 | 0 | 0 | 0 | 8 |
| | 0 | 0 | 0 | 0 | 0 | 0 | 0 | 0 | 0 | 0 | 0 | 0 | 0 | 0 | 1 | 0 | 9 |
| | 0 | 0 | 0 | 0 | 0 | 0 | 0 | 0 | 0 | 0 | 0 | 0 | 0 | 0 | 1 | 1 | 10 |
| | 0 | 0 | 0 | 0 | 0 | 0 | 0 | 0 | 0 | 0 | 0 | 0 | 1 | 1 | 0 | 0 | 11 |
| | 0 | 0 | 0 | 0 | 0 | 0 | 0 | 0 | 0 | 0 | 0 | 0 | 0 | 1 | 0 | 0 | 12 |
| | 0 | 0 | 0 | 0 | 0 | 0 | 0 | 0 | 0 | 0 | 0 | 0 | 1 | 1 | 0 | 1 | 13 |
| | 0 | 0 | 0 | 0 | 0 | 0 | 0 | 0 | 0 | 0 | 0 | 0 | 0 | 1 | 0 | 0 | 14 |
| | 0 | 0 | 0 | 0 | 0 | 0 | 0 | 0 | 0 | 0 | 0 | 0 | 1 | 1 | 1 | 1 | 15 |
| | 0 | 0 | 0 | 0 | 0 | 0 | 0 | 0 | 0 | 0 | 0 | 0 | 0 | 1 | 0 | 1 | 16 |
| Column number | 1 | 2 | 3 | 4 | 5 | 6 | 7 | 8 | 9 | 10 | 11 | 12 | 13 | 14 | 15 | 16 | |

F I G. 12

| | D(j,1) | D(j,2) | D(j,3) | D(j,4) |
|---|---|---|---|---|
| D(1) j=1 | R(1)⊕R(5)⊕R(9)⊕K(1) | R(2)⊕R(6)⊕R(10)⊕K(2) | R(3)⊕R(7)⊕R(11)⊕K(3) | R(4)⊕R(8)⊕R(12)⊕K(4) |
| D(2) j=2 | R(1)⊕R(6)⊕R(11)⊕K(4) | R(2)⊕R(7)⊕R(12) | R(3)⊕R(8) ⊕K(1) | R(4) ⊕R(9)⊕K(2) |
| D(3) j=3 | R(1)⊕R(7) ⊕K(2) | R(2)⊕R(8)⊕R(9)⊕K(3) | R(3) ⊕R(10)⊕K(4) | R(4)⊕R(5)⊕R(11) |
| D(4) j=4 | R(1)⊕R(8)⊕R(10) | R(2) ⊕R(11)⊕K(1) | R(3)⊕R(5)⊕R(12)⊕K(2) | R(4)⊕R(6) ⊕K(3) |
| D(5) j=5 | R(1) ⊕R(12)⊕K(3) | R(2)⊕R(5) ⊕K(4) | R(3)⊕R(6)⊕R(9) | R(4)⊕R(7)⊕R(10)⊕K(1) |

D(1)-D(5):n items of shared information
R(1)-R(12):(k-1)(n-1) random numbers
K(1)-K(4):n-1 items of divided secret data
⊕:Exclusive OR

FIG. 13

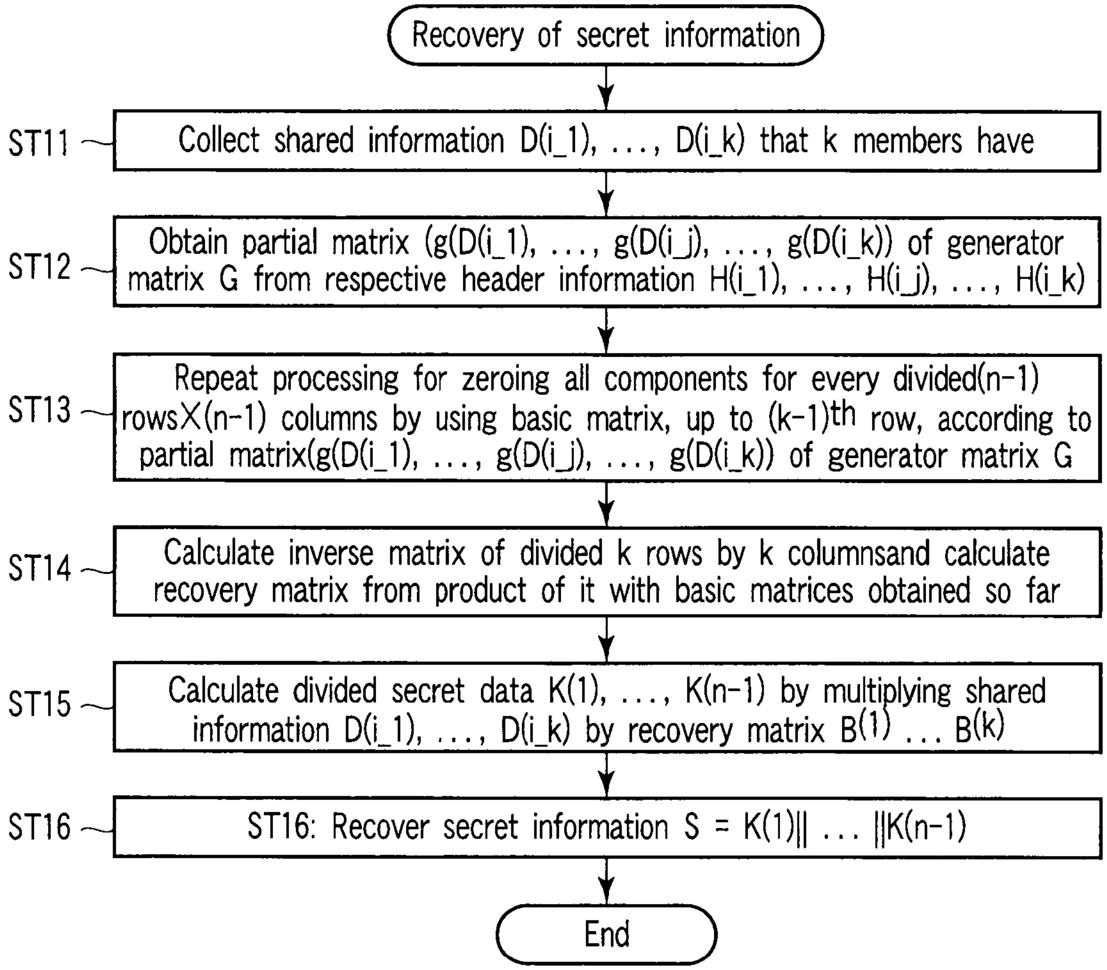
F I G. 17

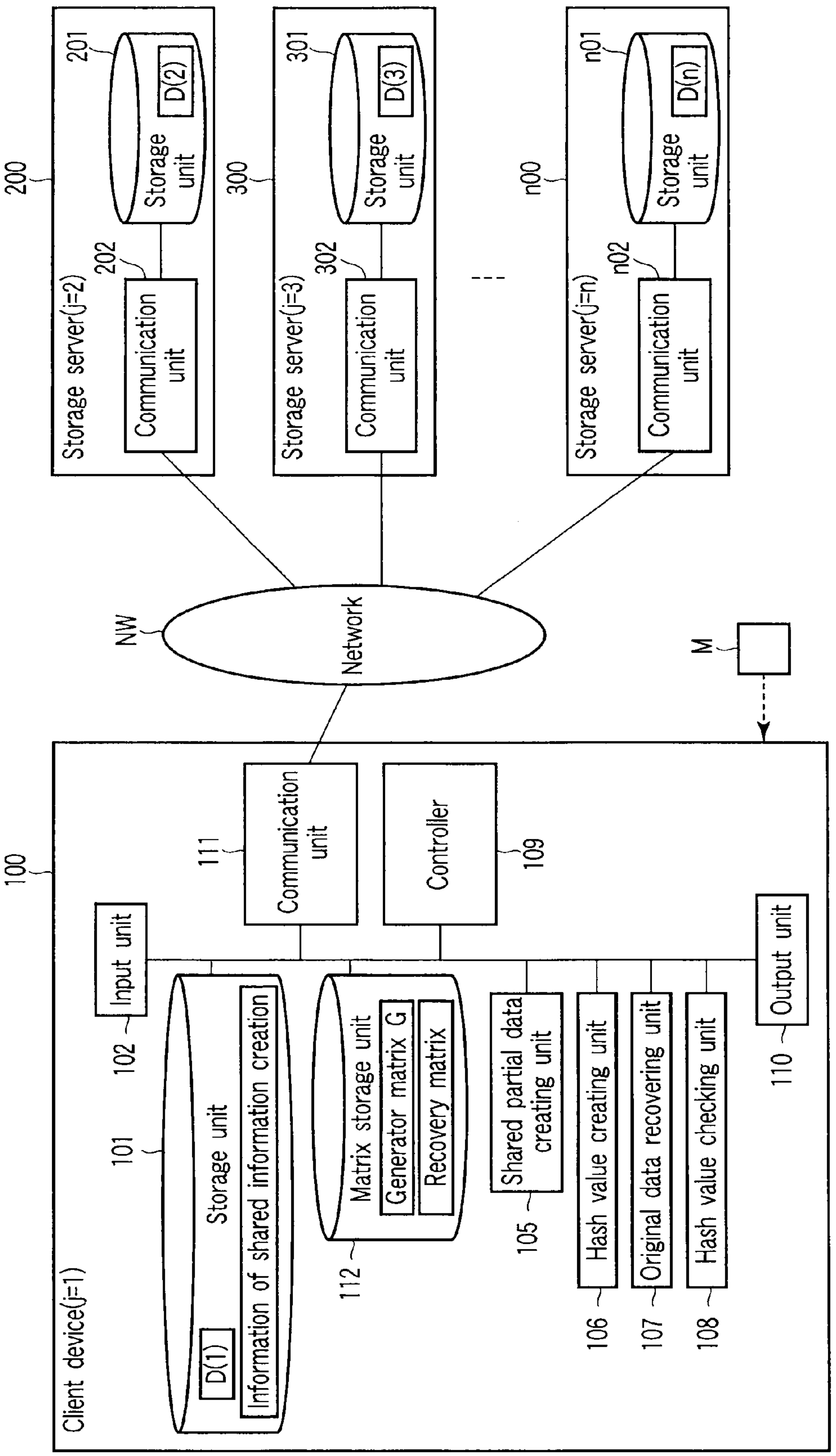
F I G. 22

Example of matrix (n-1)X(n-1) having matrix formula 1
In the case of n=5

| | | | |
|---|---|---|---|
| 1 | 1 | 1 | 0 |
| 1 | 0 | 0 | 1 |
| 0 | 1 | 0 | 1 |
| 0 | 0 | 1 | 1 |

FIG. 23 k=4,n=4

Generator matrix(=$G^{-1}$)=

| | | | | | | | | | | | | | | | |
|---|---|---|---|---|---|---|---|---|---|---|---|---|---|---|---|
| 0 | 1 | 1 | 0 | 0 | 1 | 0 | 0 | 0 | 0 | 0 | 1 | 1 | 0 | 1 | 1 |
| 1 | 1 | 0 | 1 | 0 | 1 | 1 | 0 | 1 | 1 | 1 | 0 | 0 | 0 | 0 | 1 |
| 0 | 1 | 1 | 1 | 0 | 1 | 1 | 1 | 0 | 1 | 1 | 0 | 0 | 1 | 0 | 0 |
| 0 | 0 | 1 | 0 | 1 | 0 | 0 | 0 | 0 | 0 | 1 | 0 | 1 | 0 | 0 | 1 |
| 0 | 1 | 0 | 0 | 1 | 0 | 1 | 0 | 1 | 0 | 1 | 0 | 0 | 1 | 0 | 0 |
| 0 | 1 | 1 | 0 | 1 | 1 | 1 | 1 | 1 | 1 | 1 | 1 | 0 | 1 | 1 | 0 |
| 0 | 1 | 1 | 1 | 0 | 0 | 1 | 0 | 0 | 0 | 1 | 0 | 0 | 1 | 1 | 1 |
| 1 | 0 | 0 | 0 | 1 | 0 | 1 | 1 | 1 | 0 | 1 | 1 | 1 | 0 | 0 | 0 |
| 0 | 0 | 0 | 1 | 1 | 0 | 1 | 0 | 1 | 0 | 0 | 1 | 0 | 0 | 1 | 0 |
| 1 | 1 | 1 | 0 | 1 | 1 | 1 | 1 | 0 | 0 | 1 | 0 | 0 | 0 | 1 | 1 |
| 0 | 1 | 1 | 0 | 0 | 0 | 1 | 0 | 1 | 0 | 0 | 0 | 1 | 1 | 0 | 0 |
| 0 | 0 | 1 | 0 | 1 | 0 | 1 | 1 | 1 | 1 | 0 | 1 | 0 | 1 | 0 | 0 |
| 1 | 0 | 1 | 1 | 0 | 1 | 0 | 0 | 0 | 0 | 1 | 0 | 1 | 1 | 0 | 1 |
| 0 | 0 | 0 | 1 | 0 | 1 | 1 | 0 | 0 | 0 | 1 | 1 | 0 | 1 | 0 | 0 |
| 0 | 1 | 0 | 0 | 0 | 1 | 1 | 1 | 1 | 1 | 0 | 0 | 1 | 1 | 1 | 1 |
| 1 | 0 | 0 | 1 | 1 | 0 | 0 | 0 | 0 | 1 | 0 | 0 | 0 | 1 | 0 | 1 |

FIG. 24 k=4,n=4

Recovery matrix(=G)=

| | | | | | | | | | | | | | | | |
|---|---|---|---|---|---|---|---|---|---|---|---|---|---|---|---|
| 1 | 0 | 0 | 0 | 1 | 0 | 0 | 0 | 1 | 0 | 0 | 0 | 1 | 0 | 0 | 0 |
| 0 | 1 | 0 | 0 | 0 | 1 | 0 | 0 | 0 | 1 | 0 | 0 | 0 | 1 | 0 | 0 |
| 0 | 0 | 1 | 0 | 0 | 0 | 1 | 0 | 0 | 0 | 1 | 0 | 0 | 0 | 1 | 0 |
| 0 | 0 | 0 | 1 | 0 | 0 | 0 | 1 | 0 | 0 | 0 | 1 | 0 | 0 | 0 | 1 |
| 1 | 0 | 0 | 0 | 0 | 0 | 0 | 0 | 0 | 0 | 0 | 1 | 0 | 0 | 1 | 0 |
| 0 | 1 | 0 | 0 | 1 | 0 | 0 | 0 | 0 | 0 | 0 | 0 | 0 | 0 | 0 | 1 |
| 0 | 0 | 1 | 0 | 0 | 1 | 0 | 0 | 1 | 0 | 0 | 0 | 0 | 0 | 0 | 0 |
| 0 | 0 | 0 | 1 | 0 | 0 | 1 | 0 | 0 | 1 | 0 | 0 | 1 | 0 | 0 | 0 |
| 1 | 0 | 0 | 0 | 0 | 0 | 0 | 1 | 0 | 1 | 0 | 0 | 0 | 0 | 0 | 0 |
| 0 | 1 | 0 | 0 | 0 | 0 | 0 | 0 | 0 | 0 | 1 | 0 | 1 | 0 | 0 | 0 |
| 0 | 0 | 1 | 0 | 1 | 0 | 0 | 0 | 0 | 0 | 0 | 1 | 0 | 1 | 0 | 0 |
| 0 | 0 | 0 | 1 | 0 | 1 | 0 | 0 | 0 | 0 | 0 | 0 | 0 | 0 | 1 | 0 |
| 1 | 0 | 0 | 0 | 0 | 0 | 1 | 0 | 0 | 0 | 0 | 0 | 0 | 1 | 0 | 0 |
| 0 | 1 | 0 | 0 | 0 | 0 | 0 | 1 | 1 | 0 | 0 | 0 | 0 | 0 | 1 | 0 |
| 0 | 0 | 1 | 0 | 0 | 0 | 0 | 0 | 0 | 1 | 0 | 0 | 0 | 0 | 0 | 1 |
| 0 | 0 | 0 | 1 | 1 | 0 | 0 | 0 | 0 | 0 | 1 | 0 | 0 | 0 | 0 | 0 |

FIG. 25

SECRET SHARING DEVICE, METHOD, AND PROGRAM

CROSS-REFERENCE TO RELATED APPLICATIONS

This application is based upon and claims the benefit of priority from prior Japanese Patent Application No. 2007-168082, filed Jun. 26, 2007, the entire contents of which are incorporated herein by reference.

BACKGROUND OF THE INVENTION

1. Field of the Invention

The present invention relates to a secret sharing device, method, and program using a (k, n) threshold scheme, for example, a secret sharing device, method, and program capable of realizing the (k, n) threshold scheme at high speed without using polynomial interpolation.

2. Description of the Related Art

Generally, in case secret information such as cryptographic key is lost, a measure of previously making a copy of the secret information is taken. However, making a copy of the secret information causes such a problem that increases a risk of theft. As the measure against this problem, in 1979, Shamir proposed a secret sharing method called a (k, n) threshold scheme (see, for example, A. Shamir; "How to Share a secret", Communications of the ACM, 22, 11, pp. 612-613 [1979]).

In the (k, n) threshold scheme, when the secret information is divided into n items of shared information, the original secret information can be recovered from k out of the n items of shared information but cannot be recovered at all from the k−1 items of shared information. Namely, the (k, n) threshold scheme has a secret information recovery characteristic with a threshold of k as a boundary (where $2 \leqq k \leqq n$).

According to the (k, n) threshold scheme, even when k−1 or less items of shared information are revealed, the original secret information is still safe and even when n−k or less items of shared information are lost, the original secret information can be recovered.

The Shamir (k, n) threshold scheme performs the processing of secret information sharing and recovery through polynomial interpolation that requires a lot of calculations, which is disadvantageous because it requires a high speed computer in order to share the secret information of large amount.

On the other hand, in order to resolve the above problem, there are known a method by Fujii and a method by Kurihara, as the (k, n) threshold scheme capable of reducing the calculation amount greatly (see, for example, Yoshihiro Fujii, Minako Tada, Norikazu Hosaka, Koya Tochikubo, and Takehisa Kato: "A Fast (2,n)-Threshold Scheme and Its Application", SCC2005 collection of preliminary papers, (2005), and Jun Kurihara, Shinsaku Kiyomoto, Kazuhide Fukushima, and Toshiaki Tanaka: "A (3,n)-Threshold Secret Sharing Scheme using XOR Operations", SCIS2007 collection of preliminary papers, (2007)). The Fujii method and the Kurihara method can perform the secret information sharing and recovering processing at high speed because they use only the exclusive OR operation.

The Fujii method and the Kurihara method, however, have a disadvantage that the threshold k is restricted to 2 or 3.

As set forth hereinabove, the Shamir (k, n) threshold scheme has such a disadvantage that it requires a high speed computer because of using the polynomial interpolation. On the other hand, the Fujii method and the Kurihara method have such a disadvantage that the threshold k is restricted to 2 or 3.

BRIEF SUMMARY OF THE INVENTION

The present invention has been made taking the above into consideration, and an object of the invention is to provide a secret sharing device, method, and program capable of performing a (k, n) threshold scheme on any threshold k at high speed without using the polynomial interpolation.

In a first aspect of the present invention, there is provided a secret sharing device of (k, n) threshold scheme (where $2 \leqq k \leqq n$) which individually delivers n items of shared information D(1), . . . , D(n), created by dividing secret information S, to n storage units and recovers the secret information S from any k items of shared information, of the n items of shared information, comprising: a generator matrix creating device configured to create a generator matrix G of GF(2) (where size of the generator matrix G is k(n−1) rows×n(n−1) columns and the GF(2) is a finite field of order 2) which is formed by n column vectors each including k(n−1) rows×(n−1) columns and formed by any k column vectors that become full rank, of the n column vectors; a storage device which temporarily stores the secret information S before the shared information D(1) to D(n) is delivered; a divided secret data creating device configured to create n−1 items of first divided secret data K(1), . . . , K(j), . . . , K(n−1) of the same size by dividing the secret information S into n−1 items and assigning row number j (where $1 \leqq j \leqq n-1$) from 1 to n−1 to the divided result; a random number data creating device configured to create (k−1)(n−1) items of random number data R(1), . . . , R((k−1)(n−1)) having the same size as that of said each divided secret data; a shared partial data calculating device configured to calculate a product of matrices with the random number data, the divided secret data (R(1), . . . , R((k−1)(n−1)), K(1), . . . , K(j), . . . , K(n−1)), and the generator matrix G, assign the calculation result in $(j \times (n-1)+i)^{th}$ column to the shared partial data D(j, i), and calculate n(n−1) items of shared partial data D(j, i) (where $1 \leqq j \leqq n$ and $1 \leqq i \leqq n-1$), a header information creating device configured to assign the row number j to n−1 items of shared partial data D(j, 1) to D(j, n−1) having the same row number j, of said each shared partial data, hence to create n items of header information H(1), . . . , H(j), . . . , H(n); a shared information delivering device configured to individually deliver the n items of shared information D(1), . . . , D(j), . . . , D(n), each formed by the header information H(j) and the shared partial data D(j, 1) to D(j, n−1) having the same row number j and the n column vectors, to the n storage units; a recovery matrix calculating device configured to form a partial matrix G' of k(n−1) rows ×k(n−1) columns in the generator matrix G from k column vectors included in any k items of shared information of the delivered n items of shared information D(1), . . . , D(j), . . . , D(n) and multiply a basic matrix $B^{(1)}, \ldots, B^{(k-1)}$ recursively by the partial matrix $G', \ldots, G^{(k-2)}$ so that random number components from the first row to the $(k-1)^{th}$ row become zero in every matrix unit obtained by dividing the partial matrix G' by (n−1) rows×(n−1) columns, hence to create a basic matrix $B^{(k)}$ by using an inverse matrix of the components in the $k^{th}$ row and the $k^{th}$ column in the divided unit of the partial matrix $G^{(k-1)}$ obtained by last multiplication and calculate a recovery matrix $B^{(1)} \ldots B^{(k-1)} B^{(k)}$ by multiplication of all the basic matrices; and a recovering device configured to recover the secret information by multiplying the k items of shared information by the recovery matrix.

Although the first aspect has been described as a device, it is not restricted thereto but it may be described as a program, storage medium having a program stored therein, or method.

The first aspect is designed to create shared partial data using a generator matrix G, thereby making it possible to perform the distribution process of the secret information at extremely high speed using the exclusive OR. Further, it is designed to obtain a recovery matrix by recursively processing the generator matrix by the unit of the divided block, instead of simply obtaining the inverse matrix of the generator matrix G, in the recovering processing, thereby making it possible to perform the processing at higher speed than in the case of obtaining the inverse matrix of the generator matrix G.

BRIEF DESCRIPTION OF THE SEVERAL VIEWS OF THE DRAWING

FIG. 1 is a schematic illustration showing the structure of a secret sharing system according to a first embodiment of the invention;

FIG. 6 is a schematic illustration for explaining a generator matrix in the above embodiment;

FIG. 7 is a schematic illustration for explaining how to create a basic matrix in the above embodiment;

FIG. 8 is a schematic illustration for explaining the structure of the basic matrix in the above embodiment;

FIG. 10 is a schematic illustration for explaining the structure of the basic matrix in the above embodiment;

FIG. 11 is a schematic illustration showing one example of the basic matrix in the above embodiment;

FIG. 12 is a schematic illustration showing one example of a recovery matrix in the above embodiment;

FIG. 13 is a schematic illustration for explaining shared information in the above embodiment;

FIGS. 17 and 18 are flow charts for explaining an operation of the recovering process in the above embodiment;

FIG. 22 is a schematic illustration showing a variation structure in the above embodiment;

FIG. 23 is a schematic illustration showing one example of the matrix formula applied to the secret sharing system according to a second embodiment of the invention;

FIG. 24 is a schematic illustration showing one example of the generator matrix applied to the secret sharing system according to a third embodiment of the invention; and FIG. 25 is a schematic illustration showing one example of the recovery matrix in the above embodiment.

DETAILED DESCRIPTION OF THE INVENTION

Figures 2, 3:
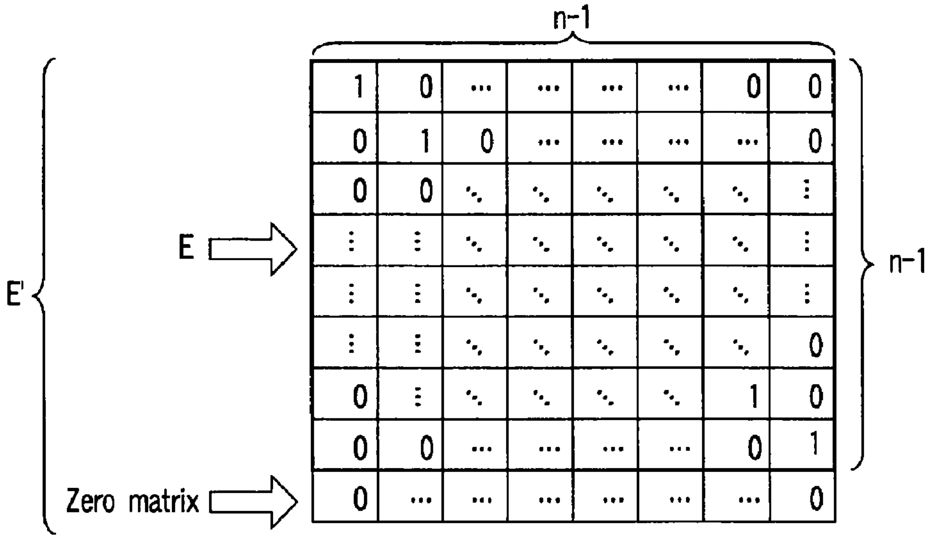
FIG. 2 is a schematic illustration showing an example of a generator matrix according to the above embodiment.
FIG. 3 is a schematic illustration for explaining a matrix for one block divided in the above embodiment.

Hereinafter, embodiments of the invention will be described with reference to the drawings. Each unit described later may be formed by hardware or a combination of hardware and software. As for the software, a program for realizing a function of a secret sharing device is used by being previously installed from a network or a storage medium M into a computer of a client device as the secret sharing device, as illustrated in FIGS. 1 and 22.

First Embodiment

FIG. 1 is a schematic illustration showing the structure of a secret sharing system, according to a first embodiment of the invention. This secret sharing system has one client device 100 and n−1 storage servers 200, 300, . . . , n00 mutually connected through a network NW such as the Internet.

The total number n of the devices 100, 200, 300, . . . , n00 correspond to n members in the (k, n) threshold scheme. Especially, n storage units 101, 201, . . . , n01 respectively included in the n devices 100, 200, 300, . . . , n00 correspond to n memories that the n members respectively have. The respective devices 100, 200, 300, . . . , n00 have the j number (row number) indicating the delivery order of the shared information. For example, j=1 is assigned to the client device 100 and j=2 is assigned to the storage server 200. The number j=3 is assigned to the storage server 300, . . . , and j=n is assigned to the storage server n00.

The client device 100 is to realize a secret sharing device of the (k, n) threshold scheme in which n items (where n≧k≧2) of shared information D(1), . . . , D(n−1) obtained by dividing the secret information S are individually delivered to the n devices 100, 200, . . . , n00 and the secret information S can be recovered from any k items of shared information, of the n items of shared information. The number of items of shared information should be k or more. For example, k=4 and n=5, the secret information S is divided into n−1 (=4) items; K(1), K(2), K(3), and K(4), and the secret information S may be recovered by using any four items of shared information from the delivered five items of shared information D(1), D(2), D(3), D(4), and D(5).

The client device 100 includes a storage unit 101, an input unit 102, a generator matrix creating unit 103, a recovery matrix creating unit 104, a shared partial data creating unit 105, a hash value creating unit 106, an original data recovering unit 107, a hash value checking unit 108, a controller 109, an output unit 110, and a communication unit 111 which are mutually connected through a bus.

The storage unit 101 is a memory as the writable and readable hardware resource controlled by the controller 109 and stores the secret information S temporarily before the shared information D(1) to D(n) described later is delivered. When the shared information D(1) to D(n) is created, the storage unit 101 stores the information about this creation of the shared information and when the shared information is delivered, it stores the shared information D(1) of j=1 and deletes the secret information S. Here, the information about the creation of the shared information is the information including the identification information j of the shared information D(j) and its relating delivery destination identification information (device ID, address information of the device, etc.).

The input unit 102 is an ordinary input device such as a keyboard or a mouse, provided with a function of entering instructions of starting the distribution process or the decoding processing and the information such as the secret information S and the like into the client device 100, through an operation of an operator.

The generator matrix creating unit 103 is controlled by the controller 109 and it is provided with a function of creating a matrix G of GF(2) which is formed by n column vectors each including k(n−1) rows×(n−1) columns and formed by any k column vectors that become full rank, of the n column vectors, as shown in the example of (4, 5) threshold scheme with k=4 and n=5 in FIG. 2, where the size of the matrix G is k(n−1) rows×n(n−1) columns, and GF(2) is a finite field of order 2. A full rank means that the rank obtained by performing a basic variation on a matrix is full (=k(n−1)) and linear independent.

Specifically, the generator matrix creating unit 103 has a function of performing the following processing (P103-1) to (P103-4).

(P103-1) When the input division number n and the threshold k are stored in the storage unit 101, the processing of dividing a matrix by the unit of (n−1) rows×(n−1) columns, according to the division number n and the threshold k within the storage unit 101 and creating a matrix E' of n rows×(n−1) columns as shown in FIG. 3, by adding a zero matrix of 1 rows×(n−1) columns to the final row of the unit matrix E of (n−1) rows×(n−1) columns.

Figure 4:
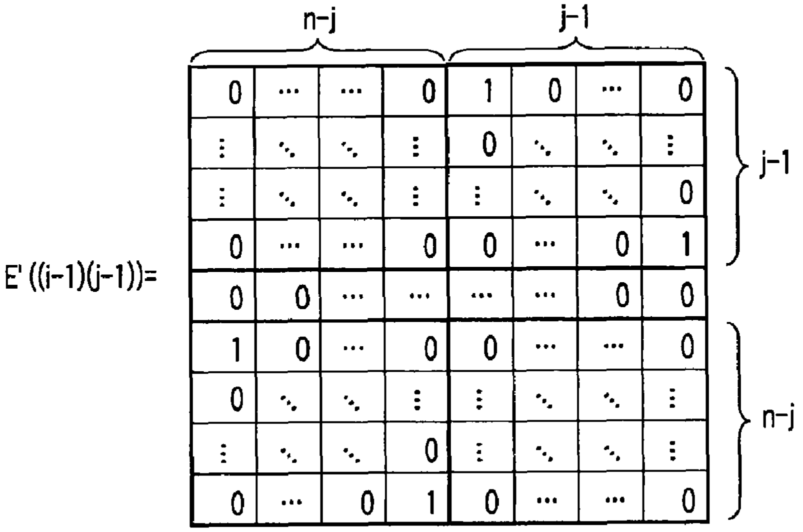
FIG. 4 is a schematic illustration for explaining a cyclic shift of the matrix for one block in the above embodiment.

(P103-2) The cyclic shift processing of creating a matrix E' ((i−1)(j−1)) by cyclically shifting the matrix E' of n rows×(n−1) columns in a vertical direction for the number of (i−1)(j−1) times, as illustrated in FIG. 4. The cyclic shift may be in any direction, vertically upward or vertically downward as long as it occurs in the one-way.

Figure 5:
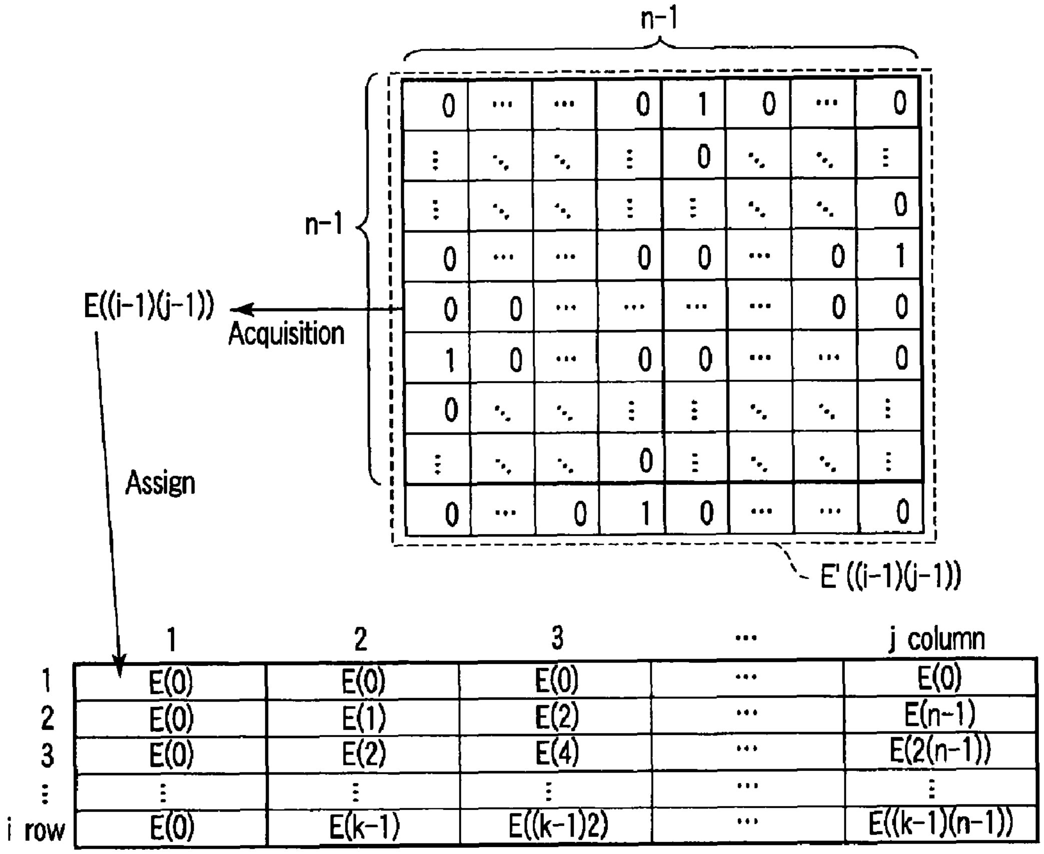
FIG. 5 is a schematic illustration for explaining how to acquire and assign a matrix after the cyclic shift in the above embodiment.

(P103-3) The assignment processing of obtaining the matrix E((i−1)(j−1)) of (n−1) rows×(n−1) columns resulting from deleting the final row from the matrix E' ((i−1)(j−1)) and assigning it to the block of i rows by j columns, as illustrated in FIG. 5.

(P103-4) The processing of obtaining a generator matrix G, as illustrated in FIG. 6, by performing the cyclic shift processing and the assignment processing on all the blocks of i rows by j columns (1≦i≦k, 1≦j≦n).

The recovery matrix creating unit 104 is controlled by the controller 109 and it is provided with a function of performing the following processing (P104-1) to (P104-10), as illustrated in FIGS. 7 to 10.

(P104-1) The processing of forming a partial matrix G' of k(n−1) rows×k(n−1) columns from the matrix G consisting of k column vectors included in any k items of shared information of the n items of delivered shared information D(1), . . . , D(j), . . . , D(n).

(P104-2) The processing of creating a basic matrix $B(^1)$ for zeroing all the components in the first row resulting from dividing the partial matrix G'=(g(D(i_1), . . . , D(i_k)))=($U_{(1.1)}$, . . . , $U_{(ij)}$, . . . , $U_{(k,k)}$)(where $U_{(ij)}$=E((i−1)(j−1))) into the unit of (n−1) rows×(n−1) columns.

(P104-3) The processing of obtaining a partial matrix $G^{(1)}$=$G'B^{(1)}$ by multiplying the partial matrix G' by the basic matrix $B^{(1)}$ to zero out all the components in the first row.

(P104-4) The processing of creating a basic matrix $B^{(2)}$ for zeroing all the components in the second row resulting from dividing the partial matrix $G^{(1)}$ by the unit of (n−1) rows×(n−1) columns.

(P104-5) The processing of obtaining a partial matrix $G^{(2)}$=$G^{(1)}B^{(2)}$ by multiplying the partial matrix $G^{(1)}$ by the basic matrix $B^{(2)}$ to zero out all the components in the resultant second row.

(P104-6) The processing of creating a basic matrix $B^{(d)}$ for zeroing all the components of the $d^{th}$ row resulting from dividing a partial matrix $G^{(d-1)}$ by the unit of (n−1) rows×(n−1) columns when the obtained partial matrix is the partial matrix $G^{(d-1)}$.

(P104-7) The processing of obtaining a partial matrix $G^{(d)}$=$G^{(d-1)}B^{(d)}G^{(d-1)}$ by multiplying the partial matrix $G^{(d-1)}$ by the basic matrix $B^{(d)}$ and zeroing all the components of the resultant $d^{th}$ row.

(P104-8) The processing of obtaining a partial matrix $G^{(k-1)}$=$G^{(k-2)}B^{(k-1)}$ by performing the basic matrix creating processing and the partial matrix creating processing recursively to the $(d=k-1)^{th}$ row.

(P104-9) The processing of calculating a basic matrix $B^{(k)}$ in which the inverse matrix $U_{(k,k)}^{-1}$ of the matrix $U_{(k,k)}$ in the $k^{th}$ row and the $k^{th}$ column in the partial matrix $G^{(k-1)}$ is arranged in the $k^{th}$ row and the $k^{th}$ column and all the other components are zeroed.

(P104-10) The processing of creating a recovery matrix $B^{(1)} \ldots B^{(k-1)}B^{(k)}$ by multiplying all the basic matrices $B^{(1)}, \ldots, B^{(k-1)}, B^{(k)}$. The recovery matrix may be created by calculating the product of the matrices $B^{(1)} \ldots B^{(k-1)}$ and multiplying the $B^{(1)} \ldots B^{(k-1)}$ by $B^{(k)}$ before obtaining the basic matrix $B^{(k)}$.

The partial matrix $G^{(k-1)}$ can be expressed in the following formula.

$$
\begin{aligned}
G^{(k-1)} &= G^{(k-2)}B^{(k-1)} \\
&= G^{(k-3)}B^{(k-2)}B^{(k-1)} \\
&= G^{(1)}B^{(2)} \ldots B^{(k-2)}B^{(k-1)} \\
&= G'B^{(1)}B^{(2)} \ldots B^{(k-2)}B^{(k-1)}
\end{aligned}
$$

The matrix in the last (n−1) columns in the right divided by the (n−1) rows by (n−1) columns in the inverse matrix $(G^{(k-1)})^{-1}$ of the partial matrix $G^{(k-1)}$ is equal to the matrix in the last (n−1) columns in the right divided by the (n−1) rows by (n−1) columns in the basic matrix $B^{(k)}$.

Here, the g(D(j)) is the partial matrix of the generator matrix G used for calculating the $j^{th}$ shared information D(j) and is referred to as a column vector. The expression (i_1) represents an arbitrary first vector, (i_j) represents an arbitrary $j^{th}$ vector, and (i_k) represents an arbitrary $k^{th}$ vector. Namely, the left i and underline in parentheses "i_" represent "arbitrary" (i of the expression "i_" is not the row number). For example, D(i_1) is an arbitrary first D(*); any of D(1) to D(5).

The basic matrix $B^{(d)}$ (=$B^{(1)}, \ldots, B^{(k-1)}$) is the matrix of k(n−1) rows×k(n−1) columns and when the components in the k rows by k columns divided by the unit of (n−1) rows×(n−1) columns are defined as $b_{1,1}, \ldots, b_{i,j}, \ldots, b_{k,k}$, they are expressed by using the component $U_{(i,j)}$ of the partial matrix $G^{(d-1)}$ (where G(0)=G'), the unit matrix E, and the zero matrix 0, as shown in FIG. 8 and as follows (where 1≦d≦k−1).

$$b_{i,j}=E(i=d,\ d+1\leqq j\leqq k),$$

$$b_{i,j}=U_{(d,j)}^{-1}\times U_{(d,d)}\ (i=j,\ d+1\leqq i, j\leqq k),$$

$$b_{i,j}=0 \text{ (the other } i,j)$$

Figure 9:
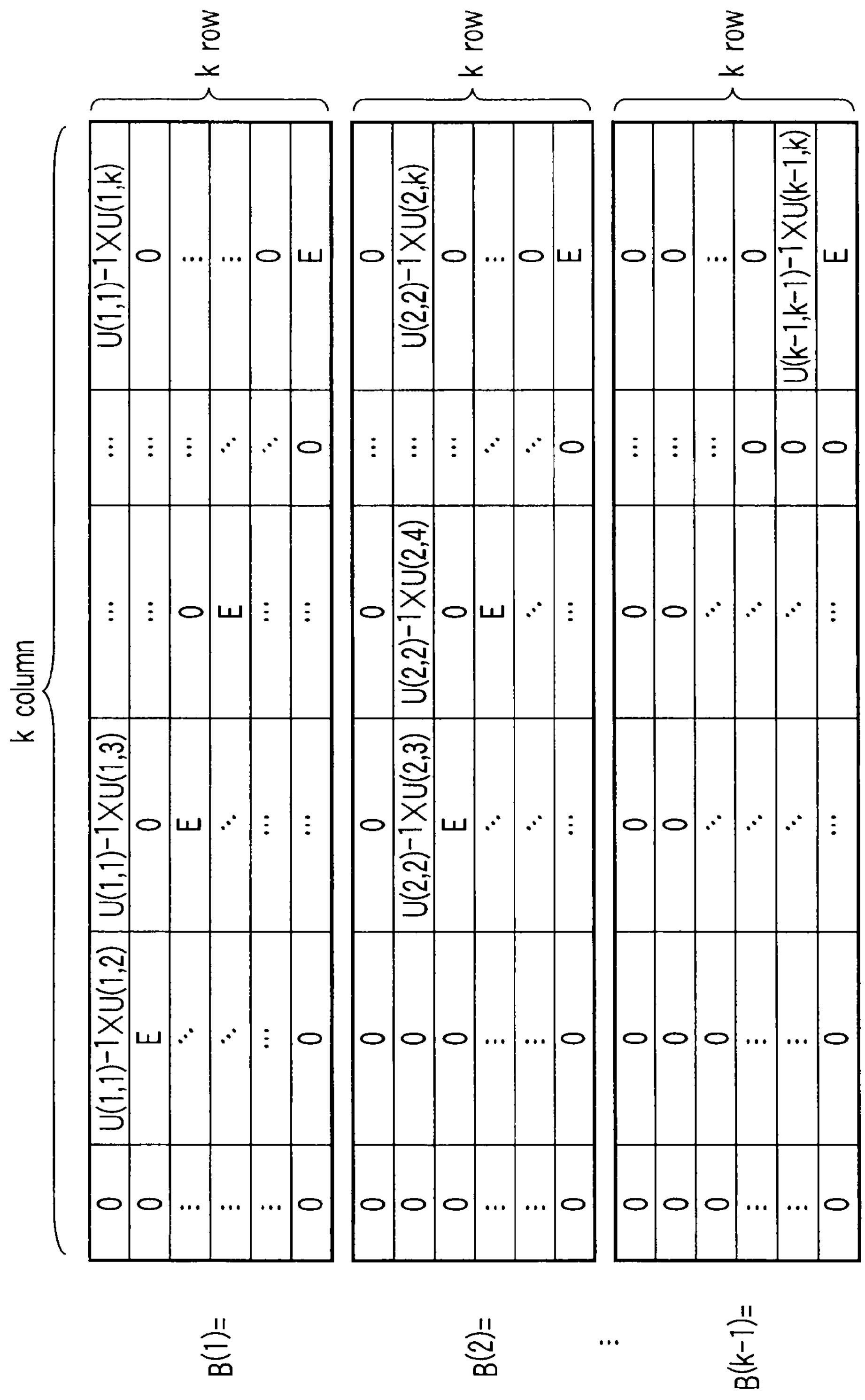
FIG. 9 is a schematic illustration for explaining another structure of the basic matrix in the above embodiment.

The basic matrix $B^{(d)}$ (=$B^{(1)}, \ldots, B^{(k-1)}$) is the matrix of k(n−1) rows×k(n−1) columns, and when the components in the k rows by the k columns divided by the unit of the (n−1) rows×(n−1) columns are defined as $b_{1,1}, \ldots, b_{i,j}, \ldots, b_{k,k}$, they can be expressed by using the component $U_{(i,j)}$ of the partial matrix $G^{(d-1)}$ (where $G^{(0)}$=G'), the unit matrix E and the zero matrix 0, as illustrated in FIG. 9 and as follows (where 1≦d≦k−1).

$$b_{i,j}=E(i=j, d+1\leqq i,j\leqq k)$$

$$b_{i,j}=U_{(d,d)}^{-1}\times U_{(d,j)} \text{ (i=d, d+1}\leqq\text{j}\leqq\text{k)}$$

$$b_{i,j}=0 \text{ (the other } i,j)$$

The matrix $B^{(k)}$ is the matrix consisting of k(n−1) rows×k (n−1) columns, and when the components in the k rows by the k columns divided by the unit of (n−1) rows×(n−1) columns are defined as $b_{1,1}, \ldots, b_{i,j}, \ldots, b_{k,k}$, they are expressed by using the inverse matrix $U_{(k,k)}^{-1}$ of the components in the $k^{th}$ row and the $k^{th}$ column in the partial matrix $G^{(k-1)}$ and the zero matrix 0 as illustrated in FIG. 10 and as follows.

$$b_{i,j}=U_{(k,k)}^{-1} (i=j=k),$$

$$b_{i,j}=0 \text{ (the other } i,j)$$

FIG. 11 shows an example of the basic matrix $B^{(1)}$, and FIG. 12 shows an example of the recovery matrix $B^{(1)}B^{(2)}B^{(3)}B^{(4)}$ formed by using the basic matrix shown in FIG. 8 in the (4, 5) threshold scheme with k=4 and n=5. In this recovery matrix $B^{(1)}B^{(2)}, \ldots, B^{(k-1)}B^{(k)}$, only the components in the $k^{th}$ column are used for calculation because the components in the first column to the $(k-1)^{th}$ column are of the zero matrix, of the components in the k rows by the k columns resulting from dividing the matrix of k(n−1) rows×k(n−1) columns by the unit of (n−1) rows×(n−1) columns. Therefore, the recovering process by the recovery matrix $B^{(1)}B^{(2)} \ldots B^{(k-1)}B^{(k)}$ is advantageous in that a calculation load is small compared with the recovering process by the inverse matrix of the matrix of k(n−1) rows×k(n−1) columns. Further, it is advantageous in that the number of the times of inverse matrix calculation is less when varying the basic matrix using the basic matrix in FIG. 9 than that in FIG. 8.

The shared partial data creating unit 105 is controlled by the controller 109 and is provided with a function of creating n(n−1) items of shared partial data D(j, i), according to the secret information S temporarily stored in the storage unit 101, as illustrated in one example of FIG. 13 (example of k=4 and n=5). Specifically, the shared partial data creating unit 105 has the following functions (f105-1) to (f105-3).

(f105-1) The function of creating n−1 items of divided secret data K(1), . . . , K(j), . . . , K(n−1) of the same size, by dividing the secret information S stored in the storage unit 101 into n−1 items and assigning the row number j (where 1≦j≦n−1) from 1 to n−1 to the divided result.

(f105-2) The function of creating (k−1)(n−1) random numbers of the same size as that of each divided secret data and creating the random number data R(1), . . . , R((k−1)(n−1)). The respective random numbers R(i), 1≦i≦(k−1)(n−1) are mutually independent.

(f105-3) The function of calculating the product of the matrix (R(1), . . . , R((k−1)(n−1)), K(1), . . . , K(j), . . . , K(n−1)) and the generator matrix G (calculation on GF(2)), according to the divided secret data K(1), . . . , K(j), . . . , K(n−1), the random number data R(1), . . . , R((k−1)(n−1)), and the generator matrix G, assigning the data in the $(j\times(n-1)+i)^{th}$ column of the calculation result to D(j, i), and calculating the n(n−1) items of shared partial data D(j, i) (where 1≦j≦n, 1≦i≦n−1).

The hash value creating unit 106 is controlled by the controller 109, and upon receipt of the header information H(j) through a bus from the controller 109, creates a hash value h(H(j)) of the header information H(j) and supplies the obtained hash value h(H(j)) to the bus. The hash value creating unit 106 may be omitted when the header information H(j) is not checked.

The original data recovering unit 107 is controlled by the controller 109 and is provided with a function of recovering the secret information S, according to any k items of shared information D(i_1), . . . , D(i_j), . . . , D(i_k) (where 1≦i_j≦n), of the n items of shared information D(1) to D(n) distributed to the client device and (n−1) storage servers 100, . . . , n00. Specifically, the original data recovering unit 107 has the following functions (f107-1) and (f107-2).

(f107-1) The function of calculating the product of the matrices, by using the recovery matrix obtained by the recovery matrix creating unit 104 from the collected k items of shared information D(i_1), . . . , D(i_j), . . . , D(i_k) and the generator matrix G and supplying the calculation result as the divided secret data K(1), . . . , K(n−1).

(f107-2) The function of recovering the secret information S=K(1)||K(2)||. . . ||K(n−1) (where || is the symbol indicating the join by joining the recovered n−1 items of divided secret data K(1), . . . , K(n−1) with each other.

The hash value checking unit 108 is controlled by the controller 109 and is provided with a function of checking the header information H(j) based on the hash value h(H(j)), upon receipt of the header information H(j) and the hash value h(H(j)) from the controller 109 through a bus, and supplying the check result to the bus. The check is made by comparison between the hash value calculated from the header information H(j) and the input hash value h(H(j)) and in the case of agreement, the header information H(j) is judged to be valid. The hash value checking unit 108 may be omitted when the header information H(j) is not checked.

Figure 14:
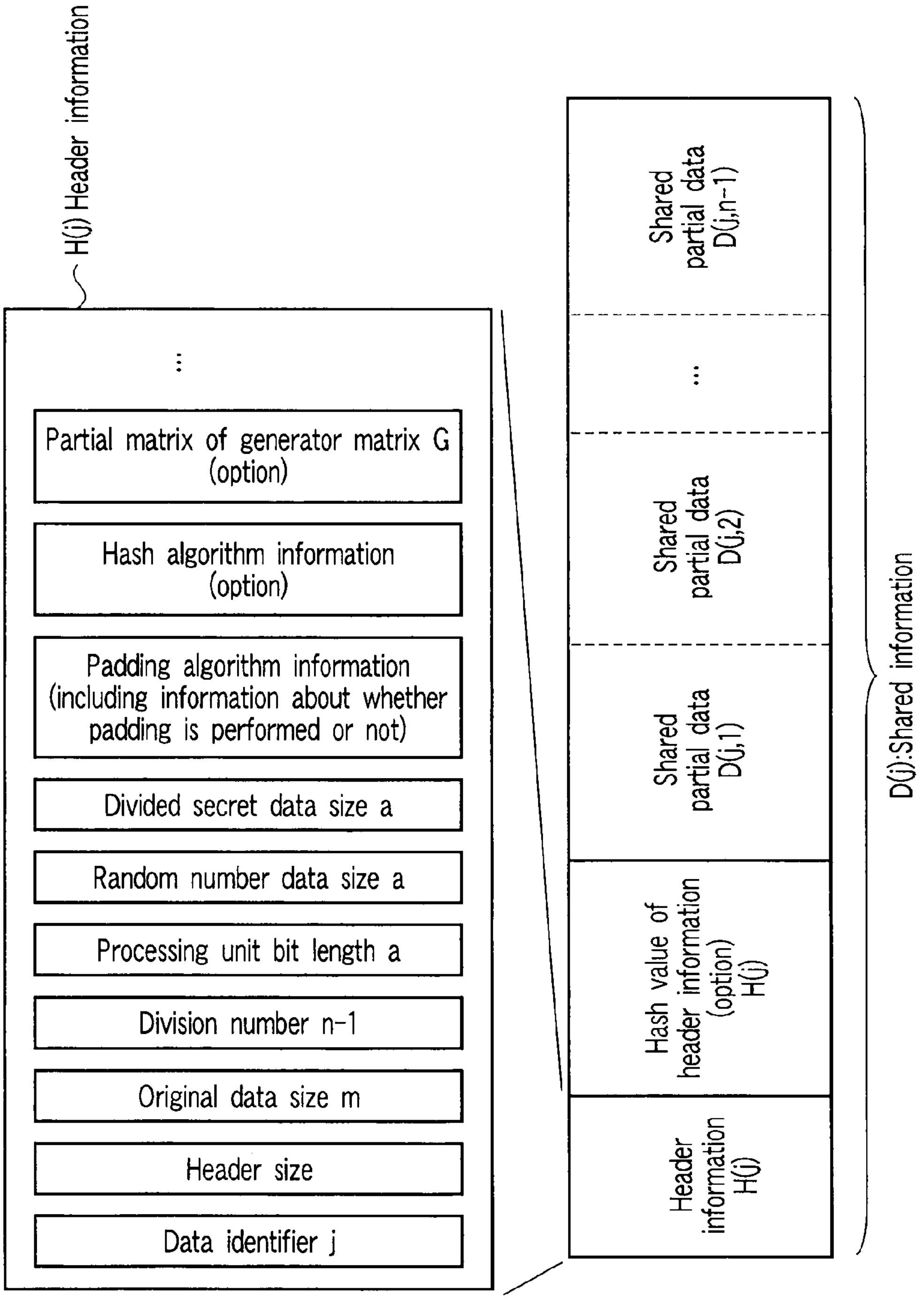
FIG. 14 is a schematic illustration showing one example of header information and shared information in the above embodiment.

The header information H(j) is considered to have data identifier indicating the row number j, header size indicating the size of header, original data size m indicating the size of original data, division number n−1 indicating the number of division of original secret information S, processing bit length a indicating the processing bit of the shared partial data D(j, i), random number data size a indicating the data size of the random number R(j), shared data size a indicating the size of the divided secret data K(j), padding algorithm indicating performance or non-performance of padding and algorithm, hash algorithm information (option), and the partial matrix g(D(j)) of the generator matrix G (option), as illustrated by one example in the upper portion of FIG. 14. The processing bit length, the random number data size, and the shared data size are all the same value "a".

The hash algorithm information is added in the case of authenticating the originality of the header information after calculating the hash value of the header information. Namely, the hash algorithm information is added or omitted depending on the requirement on the security. When the hash algorithm is previously determined in the device as the security requirement, the hash algorithm information may be omitted from the header information.

The data format of the shared information D(j) includes the header information H(j), the hash value h(H(j)), and the n−1 items of shared partial data D(j, 1), D(j, 1), . . . , D(j, n−1), as illustrated by one example in the lower portion of FIG. 14. The hash value h(H(j)) is optional and it may be omitted depending on the security requirement, and similarly to the hash algorithm information within the header information H(j).

The controller 109 has a function of controlling the respective units 101, 103 to 108, 110, and 111, based on the flow charts of FIGS. 15 to 18 described later, according to the instruction input from the input unit 102. The controller 109 has, for example, the following functions (f109-1) and (f109-2).

(f109-1) The function of assigning the row number j to n−1 items of shared partial data D(j, 1) to D(j, n−1) having the same row number j, of the shared partial data created by the shared partial data creating unit 105 and creating n items of header information H(1), . . . , H(j), . . . , H(n).

(f109-2) The function of delivering the n items of shared information D(1), . . . , D(j), . . . , D(n) including the header information H(j) and the shared partial data D(j, 1) to D(j, n−1) having the same row number j respectively to the n devices 100, 200, . . . , n00 through the communication unit 111. The controller 109 may deliver the encrypted shared information D(1) to D(n), from the viewpoint of preventing leakage of the shared information D(1) to D(n).

The output unit 110 is a usual output device such as a display and a printer, controlled by the controller 109, and it has a function of supplying an input screen of instructions and an output screen of the recovered secret information S.

The communication unit 111 is controlled by the controller 109 and is provided with a communication interface function between the client device 100 and the network NW.

The respective storage servers 200 to n00 will be described.

The respective storage servers 200 to n00 have the identical structure except that the shared information D(1) to D(n) which they respectively store is different from each other, and therefore, a description will be made taking the storage server 200 in the case of n=2 as an example.

The storage server 200 includes the storage unit 201 and the communication unit 202.

The storage unit 201 is a memory as the hardware resource readable and writable by the communication unit 202, and stores the shared information D(2) (=D(n) n=2)) delivered from the client device 100.

The communication unit 202 has a function of writing the shared information D(2) delivered from the client device 100 into the storage unit 201 and a function of reading out the shared information D(2) requested by the client device 100 from the storage unit 201 and returning the shared information D(2) to the client device 100.

The communication unit 202 may have an authentication function of the client device 100 from the viewpoint of preventing leakage of the shared information D(2), in which case it is designed to return the shared information D(2) to the client device 100 after the authentication of the client device 100.

The respective storage servers 200, 300, . . . , n00 may be replaced with another client device, Universal Serial Bus (USB) memory, cellular phone, personal digital assistant (PDA), or they may be replaced with a device other than a computer such as an external hard disc drive (HDD).

When the respective storage servers 200, 300, n00 are replaced with another client device, it may be provided with a function of the shared partial data creating unit 105 and the original data recovering unit 107, as mentioned above. In other words, a device which can recover the secret information may be something other than the client device 100. For example, some devices j00, . . . , of the storage servers 200, 300, . . . , n00 may be configured to recover the secret information.

Similarly in the case of sharing, a device which can share the secret information may be something other than the client device 100. For example, some devices j00, . . . , of the storage servers 200, 300, . . . , n00 may be configured to deliver the shared information.

When the respective storage servers 200, 300, n00 are replaced with physical connecting means such as a USB memory and a cellular phone or a device having wireless communication means, the network NW may be omitted. Modified examples with the respective storage servers 200, 300, . . . , n00 replaced with another device can be similarly applied to the following embodiments.

Next, an operation of the secret sharing system constituted as mentioned above will be described with reference to the flow charts of FIGS. 15 to 18.

At first, the case is considered where the shared information D(j) with the secret information S shared in the (k, n) threshold scheme is delivered to the n members (initial member). The n must be a prime number. The composite number is not used for the division number n. When the shared information is delivered to the composite number n, the secret sharing method is to be applied to such n' that is a prime number, satisfying n<n'. One example of the (k, n) threshold scheme will be indicated below.

(Operation of Distribution Process)

It is assumed that in the client device 100, the secret information S of the bit length m is temporarily stored in the storage unit 101 before the shared information D(1) to D(n) is delivered.

Figure 15:
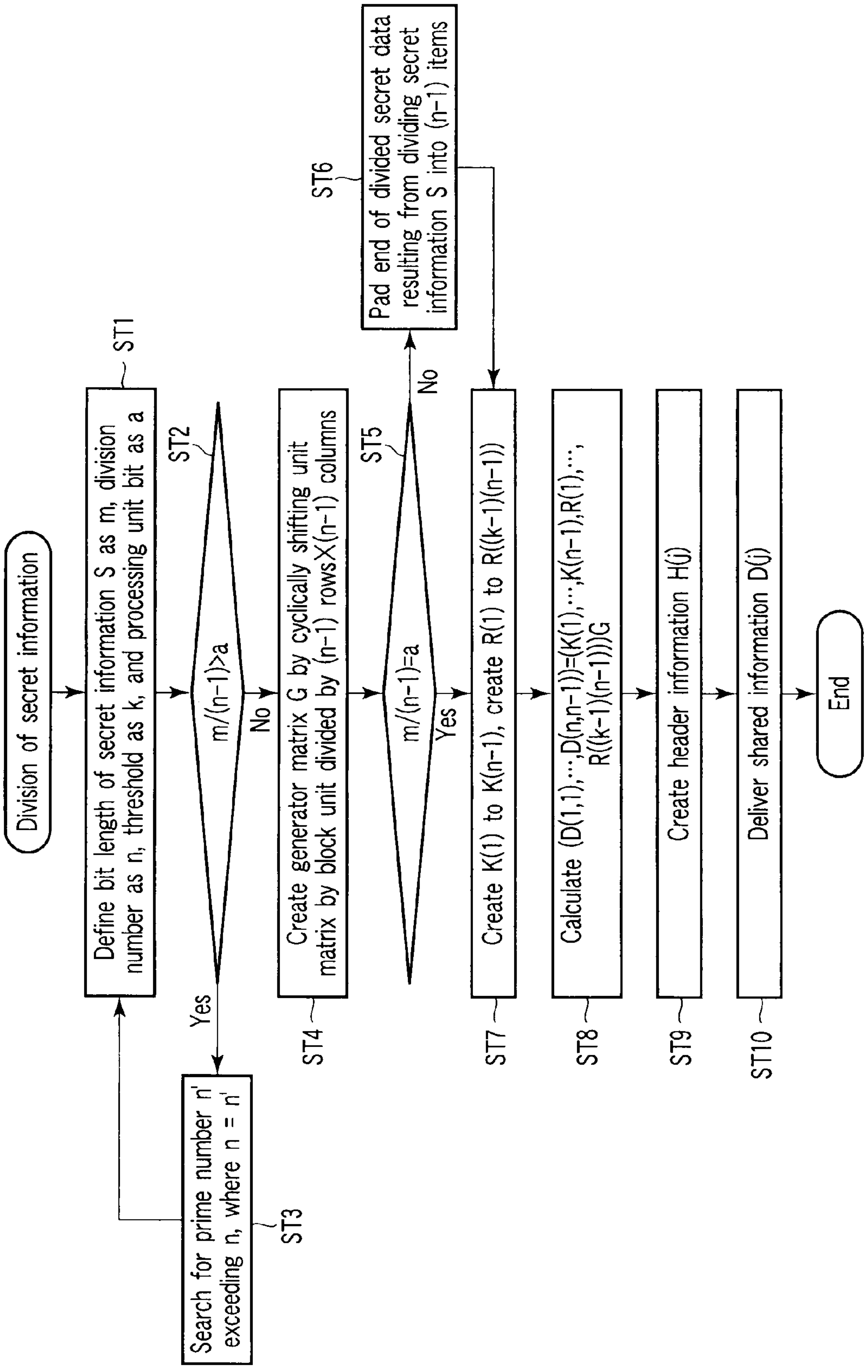
FIGS. 15 and 16 are flow charts for explaining an operation of the distribution process in the above embodiment.

At this time, in the client device 100, an operator enters an instruction of starting the distribution process through an operation of the input unit 102, as illustrated in FIG. 15 (ST1).

The client device 100 starts the distribution process according to this starting instruction. The controller 109 defines the division number as n, the threshold as k, the bit length of the secret information S as m, and the processing bit unit as a (ST1). The bit length m of the secret information S is known from the secret information S within the storage unit 101. The processing bit unit a is previously determined depending on the specification of a shared data creating unit 105.

The controller 109 then checks whether the bit length (m/(n−1)) when dividing the secret information S of the bit length m into n−1 items exceeds the processing bit unit a (m/(n−1)>a) (ST2). When it exceeds the processing bit unit a, the controller 109 searches for a prime number n' larger than n, replaces the division number n with the obtained prime number n' (ST3), and returns to Step ST1.

On the other hand, when the check result in Step ST2 is negative (i.e. false), the controller 109 enters the division number n and the threshold k into the generator matrix creating unit 103.

The generator matrix creating unit 103 supplies the division number n and the generator matrix G of the threshold k (where any k column vectors are full ranks, the size of the matrix G is k(n−1)×n(n−1), and the size of the column vector is k(n−1)×(n−1)) to the controller 109 (ST4).

The procedure of the creating processing of the generator matrix G in Step ST4 will be described below.

Figure 16:
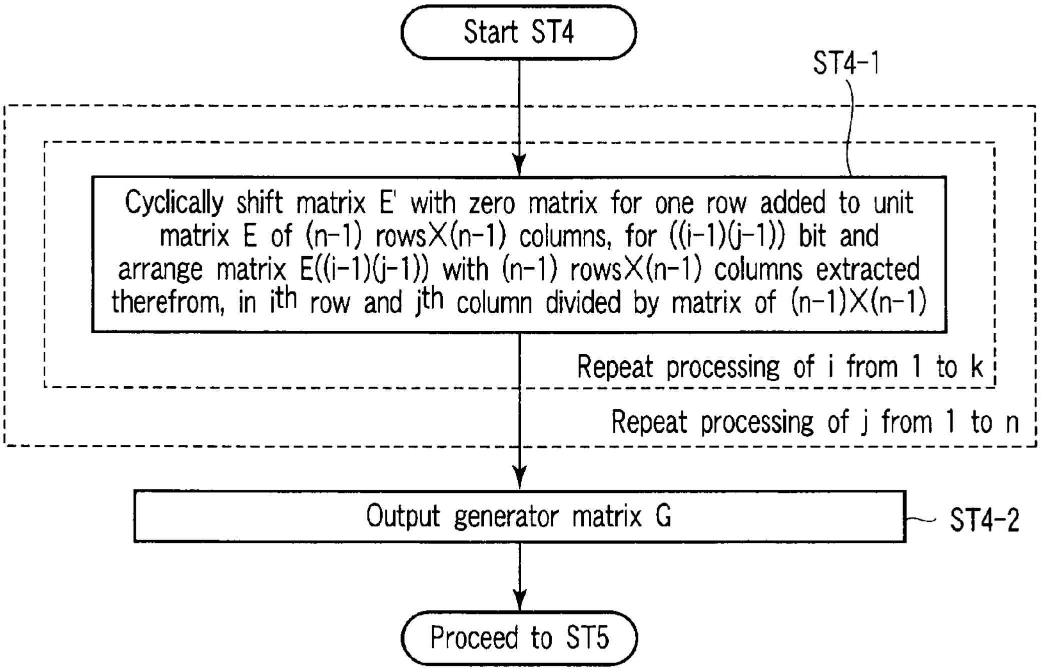

The generator matrix creating unit 103 cyclically shifts the matrix E' consisting of n rows×(n−1) columns for (i−1)(j−1) bits in a vertical direction, which is obtained by adding one row of zero matrix to the final row of the unit matrix E consisting of (n−1) rows×(n−1) columns, and arranges a small matrix E((i−1)(j−1)) resulting from extracting (n−1) rows×(n−1) columns, over the obtained matrix E' ((i−1)(j−1)), hence to create a generator matrix G, as for the matrix divided by (n−1) rows×(n−1) columns, as illustrated in FIG. 16 (ST4-1). In the example of the (4, 5) threshold scheme, the generator matrix G has the structure as shown in FIG. 2.

Thereafter, the generator matrix creating unit 103 supplies the obtained matrix G to the controller 109 (ST4-2).

As mentioned above, the creating processing of the matrix G has been finished.

After the completion of Step ST4, the controller 109 enters the secret information S, the generator matrix G, the division number n, and the threshold k to the shared partial data creating unit 105.

The shared partial data creating unit 105 checks whether the bit length (m/(n−1)) obtained by dividing the secret information S of the bit length m into n−1 items is equal to the processing bit unit a (m/(n−1)=a), based on the secret information S and the division number n, as illustrated in FIG. 15 (ST5).

When the check result in Step ST4 is negative (i.e. false), the shared partial data creating unit 105 pads the divided secret data K(n−1) that is the end of the secret information S when it is divided into the n−1 items of divided secret data K(1) to K(n−1) (performance of padding)(ST6), and proceeds to Step ST7.

The padding is not always performed on the last divided secret data K(n−1) but it may be done on the other divided secret data K(j). This embodiment will be described taking the case where the secret information S is divided in just four (no padding) as an example. The (4, 5) threshold scheme with the division number n=5 and the threshold k=4 will be taken as an example, as illustrated in FIG. 2.

When the bit length is equal to the processing bit unit a as a result of the check in Step ST5, the shared partial data creating unit 105 divides the secret information S into n−1 items and assigns the row number j (where 1≦j≦n−1) from 1 to n−1 to the shared information, hence to create the n−1 items of divided secret data K(1), . . . , K(j), . . . , K(n−1) of the same size (ST7). In the (4, 5) threshold scheme, the divided secret data K(1), . . . , K(4) is created.

Then, the shared partial data creating unit 105 creates (k−1)(n−1) random numbers of the same size as that of each divided secret data, hence to create random number data R(1), . . . , R((k−1)(n−1)) (ST7). In the (4, 5) threshold scheme, the random number data R(1), . . . , R(12) is created.

Figure 20:
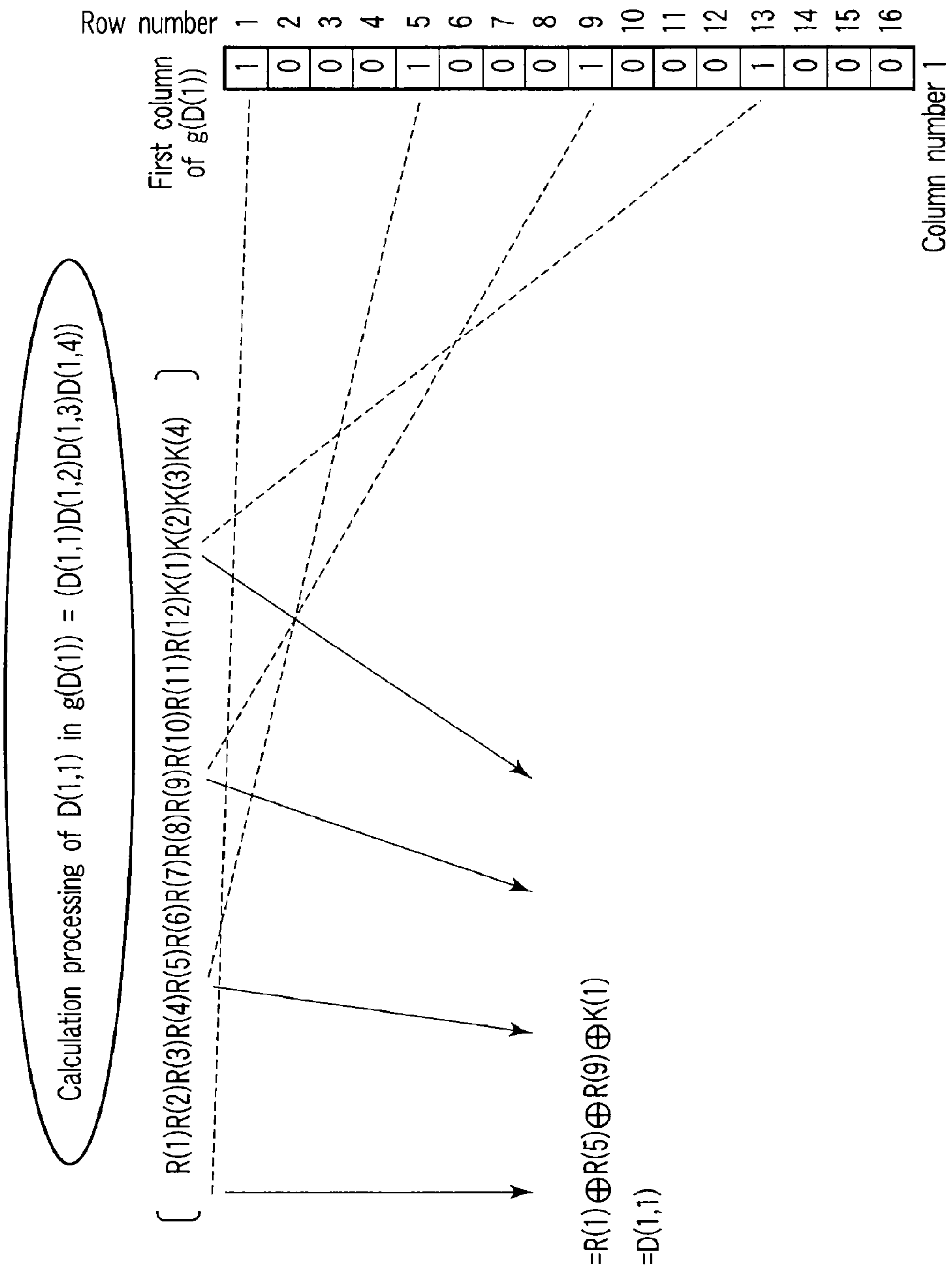
FIG. 20 is a schematic illustration for explaining the calculation processing of the shared partial data in the above embodiment.

The shared partial data creating unit 105 calculates n(n−1) items of shared partial data (D(1, 1), . . . , D(j, i), . . . , D(n, n−1))=(R(1), . . . , R((k−1) (n−1)), K(1), . . . , K(j), . . . , K(n−1)) G, according to the divided secret data K(1), . . . , K(j), . . . , K(n−1), the random number data R(1), . . . , R((k−1)(n−1)), and the generator matrix G (ST8). Based on the processing bit unit a, when the element of the generator matrix G is 1, it is treated as the unit matrix on GF(2) of a×a, while when it is 0, it is treated as the zero matrix on GF(2) of a×a. In the (4, 5) threshold scheme, 20 items of shared partial data D(j, i) are created as illustrated in FIG. 13. For example, the calculation processing of the shared partial data (1, 1) is shown in FIG. 20.

Thereafter, the shared partial data creating unit 105 supplies the shared partial data D(j, i) for the obtained n(n−1) items of shared partial data to the controller 109.

The controller 109 creates n items of header information H(1), . . . , H(j), . . . , H(n) by assigning the row number j to the n−1 items of shared partial data D(j, 1) to D(j, n−1) having the same row number j, of the shared partial data (ST9). The header information H(j) includes the information about whether or not the padding is performed on K(n−1) and the size of the original data.

The controller 109 writes the shared information D(1) into the storage unit 101 so as to deliver the n items of shared information D(1), . . . , D(j), . . . , D(n) formed by the header information H(j) and the shared partial data D(j, 1) to D(j, n−1) having the identical row number j respectively to the n storage units 101, 201, . . . , n01 and delivers the shared information D(2), . . . , D(n) respectively to the storage servers 200, . . . , n00 (ST10). In the (4, 5) threshold scheme, five items of shared information D(1), . . . , D(5) are delivered. In the respective storage servers 200 to 500, the delivered shared information D(2), . . . , D(5) is stored respectively in the storage units 201 to 501.

As mentioned above, the distribution process of the secret information has been completed.

In the (4, 5) threshold scheme, it is not always necessary to deliver five items of shared information D(1) to D(5). For example, four items of shared information D(1) to D(4) are delivered with the remaining one item of shared information D(5) properly kept by a controller, and when a new member is added, it may be delivered to the new member.

(Operation of Recovering Process)

In the client device 100, it is assumed that an operator enters an instruction of starting the recovering process through an operation of the input unit 102.

The client device 100 starts the recovering process, according to the starting instruction, as illustrated in FIG. 17. The controller 109 collects any k items of shared information D(i_1), . . . , D(i_j), . . . , D(i_k), of the n items of shared information D(1) to D(n) delivered to the n devices 100, . . . , n00 (where 1≦i_j≦n) (ST11).

When the controller 109 obtains the k column vectors g(D(i_1)), . . . , g(D(i_j)), . . . , g(D(i_k) of the generator matrix G from the header information H(i_1), . . . , H(i_j), . . . , H(i_k) of the shared information D(i_1), . . . , D(i_j), . . . , D(i_k), it forms and obtains the partial matrix G'=(g(D(i_1)), . . . , (D(i_j)), . . . , g(D(i_k)) of the generator matrix G from the k column vectors (ST12).

Next, the controller 109 enters the partial matrix G' of the generator matrix G into the recovery matrix creating unit 104.

Upon receipt of the partial matrix G'=(g(D(i_1)), . . . , g(D(i_j)), . . . , g(D(i_k)) of the generator matrix G, the recovery matrix creating unit 104 creates a basic matrix $B^{(1)}$ for zeroing all the components in the resultant first row after dividing the above partial matrix G' by the unit of (n−1) rows×(n−1) columns.

Specifically, the recovery matrix creating unit 104 arranges the unit matrix E in the d rows by the d+1 to k columns resulting from dividing the matrix of k(n−1) rows×k(n−1) columns by the unit of (n−1) rows×(n−1) columns (ST13-1).

Further, the recovery matrix creating unit 104 arranges $U_{d,j}^{-1}\times U_{d,d}$ obtained from the partial matrix G' in the d+1 to k rows by the d+1 to k columns of the above divided matrix (ST13-2).

The recovery matrix creating unit 104 arranges the zero matrix for the remaining components of the divided matrix (ST13-3), to create a basic matrix $B^{(1)}$.

Then, the recovery matrix creating unit 104 multiplies the partial matrix G' by the basic matrix $B^{(1)}$ to zero out all the components in the resultant first row, hence to obtain a partial matrix $G^{(1)}=G'B^{(1)}$.

The recovery matrix creating unit 104 similarly creates a basic matrix $B^{(2)}$ for zeroing all the components in the resultant second row after dividing the partial matrix $G^{(1)}$ by the unit of (n−1) rows×(n−1) columns and multiplies the partial matrix $G^{(1)}$ by the basic matrix $B^{(2)}$ to zero all the components in the second row, hence to obtain a partial matrix $G^{(2)}$=G(1) $B^{(2)}$ Similarly, the partial matrix $G^{(k-1)}=G^{(k-2)}B^{(k-1)}$ is obtained through recursively performing the processing up to the $(k-1)^{th}$ row (ST13).

As another example, the recovery matrix creating unit 104 arranges the unit matrix E in the d+1 to k rows by the d+1 to k columns of the matrix obtained by dividing the matrix of k(n−1) rows×k(n−1) columns by the unit of (n−1) rows×(n−1) columns (ST13'-1).

The recovery matrix creating unit 104 arranges $U_{d,d}^{-1}\times U_{d,j}$ obtained from the partial matrix G' in the d rows by d+1 to k columns of the divided matrix (ST13'-2).

The recovery matrix creating unit 104 arranges the zero matrix to the remaining components of the divided matrix (ST13'-3), to create the basic matrix $B^{(1)}$.

The recovery matrix creating unit 104 then obtains the partial matrix $G^{(1)}=G'B^{(1)}$ by multiplying the partial matrix G' by the basic matrix $B^{(1)}$ and zeroing all the components of the resultant first row.

Similarly, the recovery matrix creating unit 104 creates the basic matrix $B^{(2)}$ for zeroing all the components in the resultant second row after dividing the partial matrix $G^{(1)}$ by the unit of (n−1) rows×(n−1) columns and multiplies the partial matrix $G^{(1)}$ by the basic matrix $B^{(2)}$, to zero all the components in the resultant second row, hence to obtain the partial matrix $G^{(2)}=G^{(1)}B^{(2)}$.

The partial matrix $G^{(k-1)}=G^{(k-2)}B^{(k-1)}$ is similarly obtained through recursively performing the processing up to the $(k-1)^{th}$ row (ST13).

At that time, the recovery matrix creating unit 104 calculates the product $B^{(1)} \ldots B^{(k-1)}$ of the basic matrices (ST14-1). The recovery matrix creating unit 104 arranges the inverse matrix $U_{(k,k)}^{-1}$ of the matrix $U_{(k,k)}$ at the $k^{th}$ row and the $k^{th}$ column in the partial matrix $G^{(k-1)}$, in the $k^{th}$ row and the $k^{th}$ column, calculates the basic matrix $B^{(k)}$ with the other components defined zero, and multiplies the product $B^{(1)} \ldots B^{(k-1)}$ of the above-mentioned basic matrices by the basic matrix $B^{(k)}$, to calculate a recovery matrix $B^{(1)} \ldots B^{(k-1)}B^{(k)}$ (ST14-2).

Figure 18:
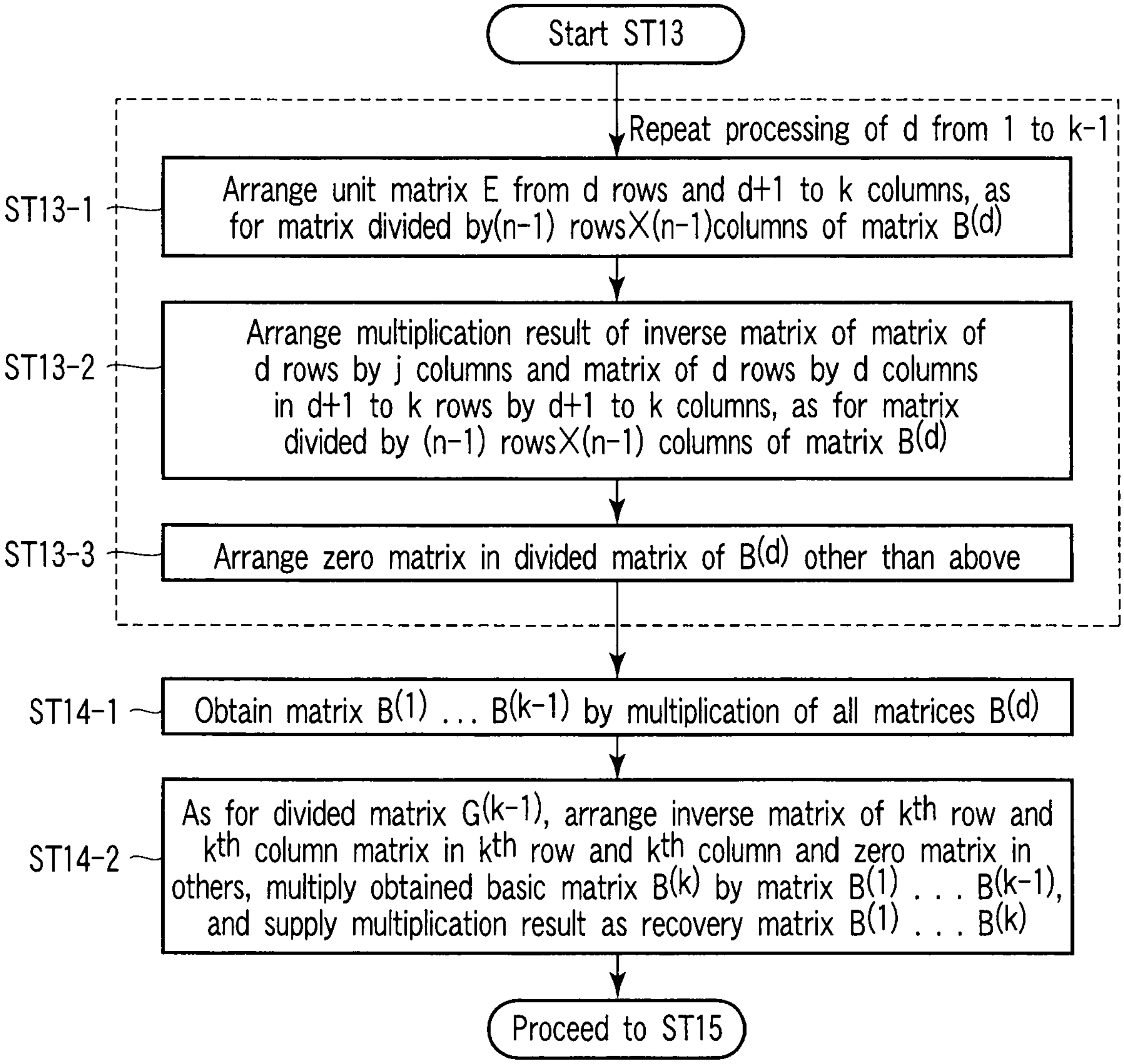
Figure 19:
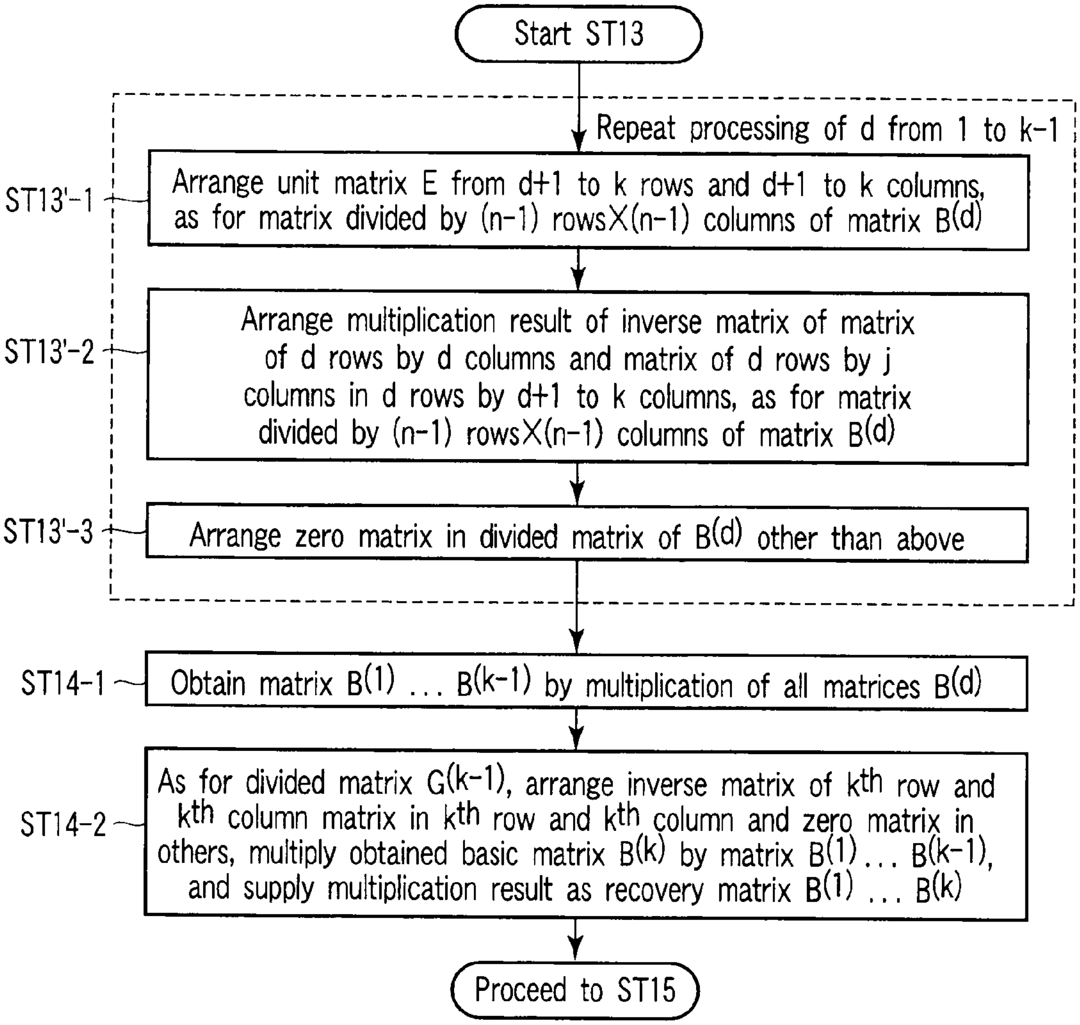
FIG. 19 is a flow chart for explaining an operation of the recovering process using another basic matrix in the above embodiment.

In the (4, 5) threshold scheme, the partial matrix G'(g(D(1)), g(D(2)), g(D(3)), g(D(4))) corresponding to the shared information D(1), D(2), D(3), D(4) becomes a matrix as shown in FIG. 2 from the first column to the $16^{th}$ column. The recovery matrix creating unit 104 repeats the processing for zeroing all the components divided by the (n−1) rows by the (n−1) columns using the basic matrix from the first row to the third row, in the shared information D(1), D(2), D(3), D(4), as illustrated in FIG. 18 or 19 and calculates the inverse matrix at the $k^{th}$ row and the $k^{th}$ column last divided, hence to calculate a recovery matrix $B^{(1)}B^{(2)}B^{(3)}B^{(4)}$. The recovery matrix in the case of using the basic matrix as shown in FIG. 18 will be a matrix as shown in FIG. 12.

The controller 109 enters the recovery matrix of the generator matrix G and the shared information D(i_1), . . . , D(i_j), . . . , D(i_k) into the original data recovering unit 107.

The original data recovering unit 107 analyzes that they are the shared information D(i_1), . . . , D(i_j), . . . , D(i_k), as illustrated in FIG. 17, from the header information H(i_1), . . . , H(i_j), . . . , H(i_k) of the shared information D(i_i), . . . , D(i_j), D(i_k).

In the (4, 5) threshold scheme, for example, it is confirmed that they are the shared information D(1), D(2), D(3), D(4).

Next, the original data recovering unit 107 calculates the product of the matrix (D(i_1), . . . , D(i_j), . . . , D(i_k)) consisting of the shared information and the recovery matrix $B^{(1)}B^{(2)} \ldots B(k-1)B^{(k)}$, hence to obtain the divided secret data K(1), . . . , K(n−1) (ST15). Based on the processing bit unit a, when the element of the recovery matrix is 1, it is treated as the unit matrix on GF(2) of a×a; when it is 0, it is treated as the zero matrix on GF(2) of a×a.

Figure 21:
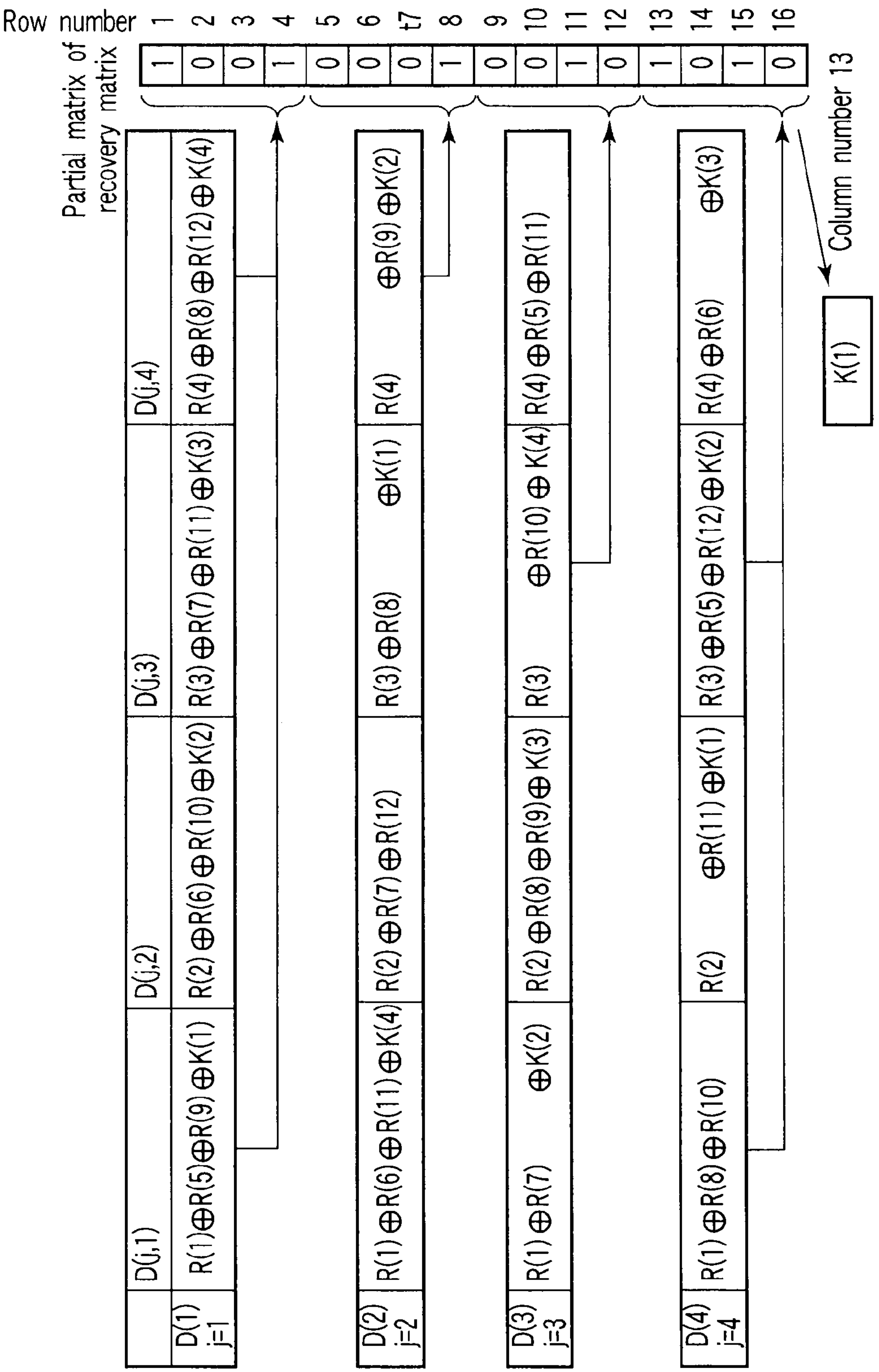
FIG. 21 is a schematic illustration for explaining the calculation processing of the divided secret data in the above embodiment.

Specifically, in the (4, 5) threshold scheme, when it is recovered from the shared information D(2), D(3), D(4), D(5), the divided secret data K(1) is calculated from, for example, the $13^{th}$ column of the recovery matrix, as illustrated in FIG. 21. The original data recovering unit 107 respectively calculates K(2), K(3), K(4) from the $14^{th}$, $15^{th}$, and $16^{th}$ columns. Here, the zero matrix in the first column to the $12^{th}$ column of the recovery matrix is not used for calculation and therefore, the calculation load is small.

The controller 109 deletes the padding, if any, from the divided secret data K(1), . . . , K(n−1) based on the header information H(i) and H(j).

Thereafter, the controller 109 joins the divided secret data K(1), . . . , K(n−1) with each other, hence to recover the secret information S=K(1)||K(2)||. . . ||K(n−1)(ST16). In this example, the secret information S=K(1)||K(2)||. . . ||K(4) is recovered.

As mentioned above, according to this embodiment, it is possible to realize the (k, n) threshold scheme which can perform the secret information sharing and the recovering process at much higher speed through exclusive OR without using the polynomial interpolation, because of the structure of generating the shared partial data using the generator matrix G.

Since the division number n and the threshold k are not restrictive in this embodiment, it can be adopted to various kinds of devices widely.

Since the distribution process of this embodiment does not need the polynomial interpolation but it is performed by only XOR, it is suitable to deal with the data of large capacity, in addition to the above-mentioned high speed performance.

Since the recovering process does not obtain the inverse matrix of the partial matrix G' in the generator matrix G but obtains the recovery matrix by recursively processing the partial matrix G' of the generator matrix G by the block unit of (n−1) rows by (n−1) columns, it has an advantage that it can be performed at higher speed than in the case of obtaining the inverse matrix of the partial matrix G' and that the secret sharing can be performed even by a low grade device.

When the recovery matrix is obtained by the recursive processing like FIG. 8, since calculation of the inverse matrix of the size (n−1) rows×(n−1) columns requires the following number of times:

$$\left(\sum_{i=1}^{k-2} i\right) + 1$$

the calculation of the inverse matrix is $(n-1)^3$, the number of times is ((k−2)(k−1)/2)+1, and the calculation amount can be generally represented by $O(k^2n^3)$.

Here, the symbol O(•) means that the order of the calculation amount is "•".

When the recovery matrix is obtained by the recursive processing like FIG. 9, the calculation of the inverse matrix of the size (n−1) rows×(n−1) columns requires the number of times (k−2)+1 and the calculation amount thereof can be represented by $0\ (kn^3)$.

Therefore, it turns out that the processing like FIG. 9 is more preferable to the processing like FIG. 8.

In the recovering process, in addition to the processing of obtaining the recovery matrix, the multiplication processing of the recovery matrix can be also performed at high speed. The reason why the multiplication processing is so fast is that in the matrix obtained by dividing the recovery matrix by the unit of (n−1) rows×(n−1) columns, the components in the first column to the $(k-1)^{th}$ column of the recovery matrix are zero matrix and not used for the multiplication but only the component in the $k^{th}$ column of the recovery matrix is used for the multiplication.

In this embodiment, although the case where the generator matrix creating unit 103 creates the generator matrix G and the recovery matrix creating unit 104 creates the recovery matrix has been described, the invention is not restricted thereto but it may be modified into the structure provided with a matrix storage unit 112 as a readable/writable memory with the data of the generator matrix G and the recovery matrix of G previously stored, as illustrated in FIG. 22, instead of the generator matrix creating unit 103 and the recovery matrix creating unit 104, when the division number n and the threshold k are previously known. This modification may realize the (k, n) threshold scheme capable of performing the sharing/recovering processing only by the exclusive OR.

Further, needless to say, it may be modified into the structure in which the data of the generator matrix G and the recovery matrix of G are previously stored in the matrix storage unit 112, in every combination of the division number n and the threshold k, and the data of the generator matrix G and the recovery matrix of G may be read out from the matrix storage unit 112 with the input n and k as a search key.

When the size of the secret information S is defined as |S| in the (k, n) threshold scheme, it is known that the size |R| of the random number necessary for the sharing satisfies the following formula.

$$|R| \geqq (k-1)|S|$$

It is apparent that in this embodiment, the size of the random number satisfies the lower limit of the above formula, and the size |R| of the random number is the minimum size necessary for the sharing in the (k, n) threshold scheme.

$$|R| = (k-1)|S|$$

Therefore, in this embodiment, the calculation necessary for the distribution process of the secret information S can be performed at high efficiency.

For comparison, the size of the random number in the (3, 5) threshold scheme described in the article written by Kurihara et al will be described. In the article written by Kurihara et al, the vector U formed by the partial secret information $S_i$ obtained by dividing the secret information S and the random number information $R_i$ and $T_i$ obtained by dividing the random number components R and T is represented by $U=(S_1, \ldots, S_4, R_1, \ldots, R_4, T_1, \ldots, T_5)$. When the generator matrix of the (3, 5) threshold scheme is G(3), G(3) will be as follows from the list 3 in the article written by Kurihara et al.

$$G(3) = \left[\begin{array}{c|c|c|c|c}
0000 & 1000 & 0100 & 0010 & 0001 \\
0001 & 0000 & 1000 & 0100 & 0010 \\
0010 & 0001 & 0000 & 1000 & 0100 \\
0100 & 0010 & 0001 & 0000 & 1000 \\
\hline
1000 & 1000 & 1000 & 1000 & 1000 \\
0100 & 0100 & 0100 & 0100 & 0100 \\
0010 & 0010 & 0010 & 0010 & 0010 \\
0001 & 0001 & 0001 & 0001 & 0001 \\
\hline
1000 & 0000 & 0001 & 0010 & 0100 \\
0100 & 1000 & 0000 & 0001 & 0010 \\
0010 & 0100 & 1000 & 0000 & 0001 \\
0001 & 0010 & 0100 & 1000 & 0000 \\
0000 & 0001 & 0010 & 0100 & 1000
\end{array}\right]$$

-continued $$G(3) = \left[\begin{array}{c|c|c|c|c}
\multicolumn{5}{c}{G(2)} \\
\hline
1000 & 0000 & 0001 & 0010 & 0100 \\
0100 & 1000 & 0000 & 0001 & 0010 \\
0010 & 0100 & 1000 & 0000 & 0001 \\
0001 & 0010 & 0100 & 1000 & 0000 \\
0000 & 0001 & 0010 & 0100 & 1000
\end{array}\right]$$

Here, G(2) is defined as the generator matrix in the (2, 5) threshold scheme in the list 2 of the article written by Fujii et al. The lower block under the G(2) relates to the random number component T in the (3, 5) threshold scheme, and it is E' itself shown in this embodiment, with the size of 5×4 matrix. Therefore, the size |R| of the random number component in the method described in the article written by Fujii will be represented by the following formula.

$$|R| = 2|S| + \frac{|S|}{(n-1)}$$

Namely, it is known that the size |R| of the random number component is not the lower limit in the method described in the non-Patent Document 3, differently from this embodiment.

Next, $G_i$ forming the generator matrix G in this embodiment will be considered. The matrix $G_{i,k}$ in the $i^{th}$ block forming the generator matrix G in the (k, n) threshold scheme and the matrix $G_{i,k-1}$ in the $i^{th}$ block forming the generator matrix G in the (k−1, n) threshold scheme have the following relation:

$$G_{i,k} = \begin{bmatrix} G_{i,k-1} \\ E((k-1) \times i) \end{bmatrix}$$

Namely, the $G_{i,k}$ in the (k, n) threshold scheme can be obtained inductively by using the $G_{i,k-1}$ in the (k−1, n) threshold scheme.

Second Embodiment

A secret sharing system according to a second embodiment of the invention will be described.

This embodiment is a modified example of the first embodiment. In the first embodiment, the generator matrix G is created by cyclically shifting the matrix E' with the zero matrix added to the unit matrix E of (n−1) rows by (n−1) columns.

This embodiment is designed to create the generator matrix G by cyclically shifting the matrix consisting of the (n−1) rows by the (n−1) columns in which generally the matrix formula becomes 1, as illustrated in FIG. 23, instead of the unit matrix E of the first embodiment. The matrix in which the matrix formula becomes 1 means the full rank matrix.

Namely, this embodiment is different from the first embodiment only in that the generator matrix G is created by using the matrix of the (n−1) rows by the (n−1) columns in which the matrix formula becomes 1 and it is the same as for the other processing.

According to the above structure, it can achieve the same function and effect as those of the first embodiment.

Third Embodiment

Next, a secret sharing system according to a third embodiment of the invention will be described.

This embodiment is a modified example of the first embodiment. In the first embodiment, the (k, n) threshold scheme is used to perform the distribution process and the recovering process.

This embodiment is designed to speed up the recovering processing by using the (n, n) threshold scheme, instead of the (k, n) threshold scheme in the first embodiment. In the (n, n) threshold scheme, the client device 100 is configured to perform the creating processing of the shared information by the inverse matrix $G^{-1}$ of the generator matrix G and the recovering processing of the secret information by the generator matrix G, with the recovery matrix creating unit 104 omitted.

The shared partial data creating unit 105 is controlled by the controller 109 and is provided with a function of creating n items of shared information D(1) to D(n), based on the secret information S temporarily stored in the storage unit 101 and the generator matrix G.

Specifically, the shared partial data creating unit 105 obtains the inverse matrix $G^{-1}$ as for the generator matrix G previously created in the distribution process and creates n items of shared information D(1) to D(n), with the inverse matrix $G^{-1}$ regarded as the generator matrix G, as illustrated in FIG. 24.

At the recovery time, the original data recovering unit 107 collects the n items of shared information D(1) to D(n) and performs the recovering processing with the generator matrix G created by the distribution process regarded as the recovery matrix, as illustrated in FIG. 25. The respective devices 101 to 103, 106, 108 to 111 operate as in the case where the threshold k is equal to the division number n (the case of k=n) in the first embodiment, as illustrated in FIG. 1.

According to the above structure, it is possible to perform the recovering process at high speed, in addition to the same function and effect as those of the first embodiment.

The technique described above for the embodiment can be stored as a program to be executed by a computer in memory mediums including magnetic disks (floppy disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. A secret sharing device of (k, n) threshold scheme (where 2≦k≦n) which individually delivers n items of shared information D(1), . . . , D(n), created by dividing secret information S, to n storage units and recovers the secret information S from any k items of shared information, of the n items of shared information, comprising:

- a generator matrix creating device configured to create a generator matrix G of GF(2) (where size of the generator matrix G is k(n−1) rows×n(n−1) columns and the GF(2) is a finite field of order 2) which is formed by n column vectors each including k(n−1) rows×(n−1) columns and formed by any k column vectors that become full rank, of the n column vectors;
- a storage device which temporarily stores the secret information S before the shared information D(1) to D(n) is delivered;
- a divided secret data creating device configured to create n−1 items of first divided secret data K(1), . . . , K(j), . . . , K(n−1) of the same size by dividing the secret information S into n−1 items and assigning row number j (where 1≦j≦n−1) from 1 to n−1 to the divided result;
- a random number data creating device configured to create (k−1)(n−1) items of random number data R(1), . . . , R((k−1)(n−1)) having the same size as that of said each divided secret data;
- a shared partial data calculating device configured to calculate a product of matrices with the random number data, the divided secret data (R(1), . . . , R((k−1)(n−1)), K(1), . . . , K(j), . . . , K(n−1)), and the generator matrix G, assign the calculation result in $(j\times(n-1)+i)^{th}$ column to the shared partial data D(j, i), and calculate n(n−1) items of shared partial data D(j, i) (where 1≦j≦n and 1≦i≦n−1);
- a header information creating device configured to assign the row number j to n−1 items of shared partial data D(j, 1) to D(j, n−1) having the same row number j, of said each shared partial data, hence to create n items of header information H(1), . . . , H(j), . . . , H(n);
- a shared information delivering device configured to individually deliver the n items of shared information D(1), . . . , D(j), D(n), each formed by the header information H(j) and the shared partial data D(j, 1) to D(j, n−1) having the same row number j and the n column vectors, to the n storage units;
- a recovery matrix calculating device configured to form a partial matrix G' of k(n−1) rows×k(n−1) columns in the generator matrix G from k column vectors included in any k items of shared information of the delivered n items of shared information D(1), . . . , D(j), . . . , D(n) and multiply a basic matrix $B^{(1)}, \ldots, B^{(k-1)}$ recursively by the partial matrix G', $G^{(k-2)}$ so that random number components from the first row to the $(k-1)^{th}$ row become zero in every matrix unit obtained by dividing the partial matrix G' by (n−1) rows×(n−1) columns, hence to create a basic matrix $B^{(k)}$ by using an inverse matrix of the components in the $k^{th}$ row and the $k^{th}$ column in the divided unit of the partial matrix $G^{(k-1)}$ obtained by last multiplication and calculate a recovery matrix $B^{(1)} \ldots B^{(k-1)}B^{(k)}$ by multiplication of all the basic matrices; and a recovering device configured to recover the secret information by multiplying the k items of shared information by the recovery matrix.

2. A secret sharing method performed by the secret sharing device according to claim 1, the method comprising:

storing an input division number n and threshold k in the storage device;

creating, by the generator matrix creating device, a matrix E' of n rows×(n−1) columns by adding a zero matrix of one row×(n−1) columns to the final row of a unit matrix E of (n−1) rows×(n−1) columns;

executing, by the generator matrix creating device, a cyclic shift process of creating a matrix E'((i−1)(j−1)) by cyclically shifting the matrix E' of n rows×(n−1) columns in a vertical direction (i−1)(j−1) times;

executing, by the generator matrix creating device, an assignment process of obtaining a matrix E((i−1)(j−1)) of (n−1) rows×(n−1) columns resulting from deleting the final row from the matrix E'((i−1)(j−1) and assigning the matrix E to the block of i rows by j columns, when dividing the matrix by the unit of (n−1) rows×(n−1) columns, based on the division number n and the threshold k within the storage device; and as a result, by the generator matrix creating device, having created the generator matrix G by having performed the cyclic shift process and the assignment process on all the blocks of i rows by j columns (1≦i≦k, 1≦j≦n).

3. The secret sharing method according to claim 2, further comprising:

creating, by the recovery matrix calculating device, a basic matrix $B^{(1)}$ for zeroing all components in the first row resulting from dividing a partial matrix G'=(g(D (i_1), . . . , D(i_k))=$(U_{(1,1)}, \ldots, U_{(i,j)}, \ldots, U_{(k,k)})$ (where $U_{(i,j)}=E_{((i-1)(j-1))}$) of the generator matrix G by the unit of (n−1) rows×(n−1) columns;

obtaining, by the recovery matrix calculating device, a partial matrix $G^{(1)}=G'B^{(1)}$ by multiplying the partial matrix G' by the basic matrix $B^{(1)}$ to zero all the components in the above first row;

executing, by the recovery matrix calculating device, a basic matrix creating process of creating a basic matrix $B^{(d)}$ for zeroing all the components in the $d^{th}$ row resulting from dividing a partial matrix $G^{(d-1)}$ by the unit of (n−1) rows×(n−1) columns, when the obtained partial matrix is defined as the partial matrix $G^{(d-1)}$;

executing, by the recovery matrix calculating device, a partial matrix creating process of obtaining a partial matrix $G^{(d)}=G^{(d-1)}B^{(d)}$ by multiplying the partial matrix $G^{(d-1)}$ by the basic matrix $B^{(d)}$ to zero all the components in the above $d^{th}$ row;

obtaining, by the recovery matrix calculating device, a partial matrix $G^{(k-1)}=G^{(k-2)}B^{(k-1)}$ by recursively performing the basic matrix creating process and the partial matrix creating process up to $(d=k-1)^{th}$ row;

calculating, by the recovery matrix calculating device, a basic matrix $B^{(k)}$ by arranging an inverse matrix $U_{(k,k)}{}^{-1}$ of a matrix $U_{(k,k)}$ in the $k^{th}$ row and $k^{th}$ column in the partial matrix $G^{(k-1)}$, for the component in the $k^{th}$ row and the $k^{th}$ column and arranging a zero matrix for the other components; and creating, by the recovery matrix calculating device, a recovery matrix $B^{(1)} \ldots B^{(k-1)}B^{(k)}$ by multiplication of all the basic matrices $B^{(1)}, \ldots, B^{(k-1)}, B^{(k)}$.

4. A secret sharing device of (n, n) threshold scheme (where 2≦n) which individually delivers n items of shared information D(1), . . . , D(n), created by dividing secret information S, to n storage units and recovers the secret information S from the n items of shared information, comprising:

a generator matrix creating device configured to create a generator matrix G of GF(2) (where size of the generator matrix G is n(n−1) rows×n(n−1) columns and the GF(2) is a finite field of order 2) which is formed by n column vectors each including n(n−1) rows×(n−1) columns and formed by the n column vectors that become full rank;

a storage device which temporarily stores the secret information S before the shared information D(1) to D(n) is delivered;

a divided secret data creating device configured to create n−1 items of first divided secret data K(1), . . . , K(j), . . . , K(n−1) of the same size by dividing the secret information S into n−1 items and assigning row number j (where 1≦j≦n−1) from 1 to n−1 to the divided result;

a random number data creating device configured to create $(n-1)^2$ items of random number data R(1), . . . , R($(n-1)^2$) having the same size as that of said each divided secret data;

a shared partial data calculating device configured to calculate a product of matrices with the random number data, the divided secret data (R(1), . . . , R($(n-1)^2$), K(1), . . . , K(j), . . . , K(n−1)), and the inverse matrix $G^{-1}$ of the generator matrix G, assign the calculation result in $(j\times(n-1)+i)^{th}$ column to the shared partial data D(j, i), and calculate n(n−1) items of shared partial data D(j, i) (where 1≦j≦n and 1≦i≦n−1);

a header information creating device configured to assign row number j to n−1 items of shared partial data D(j, 1) to D(j, n−1) having the same row number j, of said each shared partial data, and to create n items of header information H(1), . . . , H(j), . . . H(n) (where 1≦j≦n);

a shared information delivering device configured to individually deliver the header information H(j) and the shared partial data D(j, 1) to D(j, n−1) having the same row number j and the n items of shared information D(1), . . . , D(j), . . . , D(n) each formed by the n column vectors to the n storage units; and a recovering device configured to recover the secret information by multiplying the delivered n items of shared information D(1), . . . , D(j), . . . , D(n) by the generator matrix G.

5. A secret sharing method performed by the secret sharing device according to claim 4, the method comprising:

storing an input division number n and threshold n in the storage device;

creating, by the generator matrix creating device, a matrix E' of n rows×(n−1) columns by adding a zero matrix of one row×(n−1) columns to the final row of a unit matrix E of (n−1) rows×(n−1) columns;

executing, by the generator matrix creating device, a cyclic shift process of creating a matrix E'((i−1)(j−1)) by cyclically shifting the matrix E' of n rows×(n−1) columns in a vertical direction (i−1)(j−1) times;

executing, by the generator matrix creating device, an assignment process of obtaining a matrix E((i−1)(j−1)) of (n−1) rows×(n−1) columns resulting from deleting the final row from the matrix E'((i−1)(j−1) and assigning the matrix E to the block of i rows by j columns, when dividing the matrix by the unit of (n−1) rows×(n−1) columns, based on the division number n and the threshold n within the storage device; and as a result, by the generator matrix creating device, having created the generator matrix G by having performed the cyclic shift process and the assignment process on all the blocks of i rows by j columns (1≦i≦n, 1≦j≦n).

6. A non-transitory computer-readable storage medium that stores a program for use in a secret sharing device of (k, n) threshold scheme (where 2≦k≦n) which individually delivers n items of shared information D(1), . . . , D(n), created by dividing secret information S, to n storage units and recovers the secret information S from any k items of shared information, of the n items of shared information, the program, when executed, causes the secret sharing device to execute a method comprising:

performing processing of creating a generator matrix G of GF(2) (where size of the generator matrix G is k(n−1) rows×n(n−1) columns and the GF(2) is a finite field of order 2) which is formed by n column vectors each including k(n−1) rows×(n−1) columns and formed by any k column vectors that become full rank, of the n column vectors;

performing processing of temporarily storing the secret information S in the storage unit of the secret sharing device before the shared information D(1) to D(n) is delivered;

performing processing of creating n−1 items of first divided secret data K(1), . . . , K(j), . . . , K(n−1) of the same size by dividing the secret information S into n−1 items and assigning row number j (where 1≦j≦n−1) from 1 to n−1 to the divided result;

performing processing of creating (k−1)(n−1) items of random number data R(1), . . . , R((k−1)(n−1)) having the same size as that of said each divided secret data;

performing processing of calculating a product of matrices (calculation on GF(2)) with the random number data, the divided secret data (R(1), . . . , R((k−1)(n−1)), K(1), . . . , K(j), . . . , K(n−1)), and the generator matrix G, assigning the calculation result in $(j\times(n-1)+i)^{th}$ column to the shared partial data D(j, i), and calculating n(n−1) items of shared partial data D(j, i) (where 1≦j≦n and 1≦i≦n−1);

performing processing of assigning row number j to n−1 items of shared partial data D(j, 1) to D(j, n−1) having the same row number j, of said each shared partial data, hence to create n items of header information H(1), . . . , H(j), . . . , H(n);

performing processing of individually delivering the n items of shared information D(1), . . . , D(j), . . . , D(n), each formed by the header information H(j) and the shared partial data D(j, 1) to D(j, n−1) having the same row number j and the n column vectors, to the n storage units;

performing processing of forming a partial matrix G' of k(n−1) rows×k(n−1) columns in the generator matrix G from k column vectors included in any k items of shared information of the delivered n items of shared information D(1), . . . , D(j), . . . , D(n) and multiplying a basic matrix $B^{(1)}, \ldots, B^{(k-1)}$ recursively by the partial matrix $G', \ldots, G^{(k-2)}$ so that random number components from the first row to the $(k-1)^{th}$ row become zero in every matrix unit obtained by dividing the partial matrix G' by (n−1) rows×(n−1) columns, hence to create a basic matrix $B^{(k)}$ by using an inverse matrix of the components in the $k^{th}$ row and the $k^{th}$ column in the divided unit of the partial matrix $G^{(k-1)}$ obtained by last multiplication and calculate a recovery matrix $B^{(1)} \ldots B^{(k-1)}B^{(k)}$ by multiplication of all the basic matrices; and performing processing of recovering the secret information by multiplying the k items of shared information by the recovery matrix.

7. A non-transitory computer-readable storage medium that stores a program for use in a secret sharing device of (n, n) threshold scheme (where 2≦n) which individually delivers n items of shared information D(1), . . . , D(n), created by dividing secret information S, to n storage units and recovers the secret information S from the n items of shared information, the program, when executed, causes the secret sharing device to execute a method comprising:

performing processing of creating a generator matrix G of GF(2) (where size of the generator matrix G is n(n−1) rows×n(n−1) columns and the GF(2) is a finite field of order 2) which is formed by n column vectors each including n(n−1) rows×(n−1) columns and formed by the n column vectors that become full rank;

performing processing of temporarily storing the secret information S in the storage unit of the secret sharing device before the shared information D(1) to D(n) is delivered;

performing processing of creating n−1 items of first divided secret data K(1), . . . , K(j), . . . , K(n−1) of the same size by dividing the secret information S within the storage unit into n−1 items and assigning row number j (where 1≦j≦n−1) from 1 to n−1 to the divided result;

performing processing of creating $(n-1)^2$ items of random number data R(1), . . . , $R((n-1)^2)$ having the same size as that of said each divided secret data;

performing processing of calculating a product of matrices (calculation on GF(2)) with the random number data, the divided secret data (R(1), . . . , $R((n-1)^2)$, K(1), . . . , K(j), . . . , K(n−1)), and the inverse matrix $G^{-1}$ of the generator matrix G, assigning the calculation result in $(j\times(n-1)+i)^{th}$ column to the shared partial data D(j, i), and calculating n(n−1) items of shared partial data D(j, i) (where 1≦j≦n and 1≦i≦n−1);

performing processing of assigning row number j to n−1 items of shared partial data D(j, 1) to D(j, n−1) having the same row number j, of said each shared partial data, hence to create n items of header information H(1), . . . , H(j), . . . , H(n);

performing processing of individually delivering the n items of shared information D(1), . . . , D(j),. . . , D(n), each formed by the header information H(j) and the shared partial data D(j, 1) to D(j, n−1) having the same row number j and the n column vectors, to the n storage units; and performing processing of recovering the secret information by multiplying the delivered n items of shared information D(1), . . . , D(j), . . . , D(n) by the generator matrix G.

* * * * *